(12) United States Patent
Menichetti

(10) Patent No.: US 6,834,488 B2
(45) Date of Patent: Dec. 28, 2004

(54) TOWABLE HAY RAKE WITH AN AUTOMATIC STEERING MECHANISM

(75) Inventor: Silvano Menichetti, Umbertide (IT)

(73) Assignee: Sitrex S.r.l., Trestina (IT)

( * ) Notice: Subject to any disclaimer, the term of this patent is extended or adjusted under 35 U.S.C. 154(b) by 0 days.

(21) Appl. No.: 10/302,333

(22) Filed: Nov. 22, 2002

(65) Prior Publication Data

US 2004/0098961 A1 May 27, 2004

(51) Int. Cl.$^7$ .................. A01D 76/00; A01D 78/00; A01D 80/00; A01D 84/00
(52) U.S. Cl. .................................................... 56/378
(58) Field of Search .................. 56/376, 375, 400, 56/377, 378, 379, 382, 384, 396

(56) References Cited

U.S. PATENT DOCUMENTS

| | | |
|---|---|---|
| 3,208,536 A | 9/1965 | Orendorff |
| 3,484,803 A | 12/1969 | Breed et al. |
| 3,498,387 A | 3/1970 | Roth |
| 3,814,191 A | 6/1974 | Tilbury |
| 3,817,405 A | 6/1974 | Neely, Jr. |
| 3,834,142 A | 9/1974 | Johnston et al. |
| 3,936,994 A | 2/1976 | Mortier et al. |
| 3,995,416 A | 12/1976 | van der Lely |
| 4,011,914 A | 3/1977 | Elmer |
| 4,034,623 A | 7/1977 | Boone et al. |
| 4,043,099 A | 8/1977 | Cheatum |
| 4,049,062 A | 9/1977 | Rossmiller et al. |
| 4,058,958 A | 11/1977 | Sadler et al. |
| 4,077,189 A | 3/1978 | Hering |
| 4,171,726 A | 10/1979 | Ward |
| 4,172,537 A | 10/1979 | Gandrud et al. |
| 4,183,198 A | 1/1980 | Sligter |

(List continued on next page.)

FOREIGN PATENT DOCUMENTS

| | | | |
|---|---|---|---|
| CA | 2313362 A1 * | 1/2002 | ........... A01B/73/06 |
| DE | 2406702 | 2/1974 | |
| DE | 2455660 | 7/1975 | |
| DE | 2414098 | 10/1975 | |
| DE | 2818359 | 11/1979 | |
| GB | 2017476 | 10/1979 | |

OTHER PUBLICATIONS

Hodg–Bilt, Product data for "Hay Rake Carrier", no date.
Sitrex, Operator's and Service Parts Manual, no date.
Vicar, Product data for "Crop–Driven Fingerwheel Rakes", no date.
H&S Manufacturing Product data for "Wheel Rake" and "Bi–Fold Wheel Rake" (Jan. 2, 1992).
H&S Manufacturing, Product data for "Wheel Rake" and "Bi–Fold Wheel Rake" (Oct. 1989).
Italmacchine, Product data, no date.
Taege, Product data for "Multi Purpose Vee Rakes", no date.
Read, Product data for "Multi–Rake", no date.
Tonutti s.p.a., Product data for "Rotary Rakes", no date.
Kuhn, Product data for "GA Gyrorakes", 1991.
M&W SR320P Rotary Hay Rake (product data), no date.

Primary Examiner—Árpád Fab Kovács
(74) Attorney, Agent, or Firm—Kenyon & Kenyon

(57) ABSTRACT

A towable hay rake that includes an automatic steering mechanism. The hay rake includes a front portion, such as a separate carriage section, connectable to the towing vehicle. In addition, the hay rake includes at least one wheel, but preferably two wheels, mounted to, e.g., a rear end, of the hay rake. The automatic steering mechanism is coupled to the front portion of the hay rake and is configured to be actuated by a change in towing direction of the towing vehicle. The automatic steering mechanism is configured upon actuation to steer the wheels of the hay rake. According to various embodiments, the automatic steering mechanism may be configured to steer any wheels of the hay rake, regardless of the position of the wheels on the hay rake.

7 Claims, 34 Drawing Sheets

U.S. PATENT DOCUMENTS

| | | | |
|---|---|---|---|
| 4,194,348 A | 3/1980 | Gerlinger | |
| 4,198,805 A | 4/1980 | Gerlinger | |
| 4,202,160 A | 5/1980 | van der Lely | |
| 4,203,277 A | 5/1980 | Kaetzel | |
| 4,214,428 A | 7/1980 | Caraway | |
| 4,218,867 A | 8/1980 | Kaetzel | |
| 4,245,457 A | 1/1981 | Gerlinger | |
| 4,245,458 A | 1/1981 | Smith | |
| 4,248,260 A | 2/1981 | Addison et al. | |
| 4,254,609 A | 3/1981 | van der Lely | |
| 4,274,249 A | 6/1981 | Hauser | |
| 4,275,551 A | 6/1981 | van der Lely | |
| 4,275,552 A | 6/1981 | DeCoene | |
| 4,292,793 A | 10/1981 | Hauser | |
| 4,352,268 A | 10/1982 | van der Lely et al. | |
| 4,366,867 A | 1/1983 | Filbrun | |
| 4,367,622 A | 1/1983 | Aron et al. | |
| 4,370,846 A | 2/1983 | Arnold | |
| 4,395,868 A | 8/1983 | Kaetzel | |
| 4,397,135 A | 8/1983 | Wattron | |
| 4,457,127 A | 7/1984 | Maier et al. | |
| 4,529,040 A | 7/1985 | Grollimund | |
| 4,555,897 A | 12/1985 | Degelman | |
| 4,621,487 A | 11/1986 | Urlacher et al. | |
| 4,622,806 A | 11/1986 | Bahnman et al. | |
| 4,641,491 A | 2/1987 | van der Lely et al. | |
| 4,682,462 A | 7/1987 | Johnson, Sr. | |
| 4,685,282 A | 8/1987 | Allen | |
| 4,723,401 A | 2/1988 | Webster et al. | |
| 4,723,402 A | 2/1988 | Webster et al. | |
| 4,723,403 A | 2/1988 | Webster | |
| 4,723,404 A | 2/1988 | Aron | |
| 4,753,063 A | 6/1988 | Buck | |
| D298,139 S | 10/1988 | van Staveren | |
| 4,776,157 A | 10/1988 | van der Lely et al. | |
| 4,785,614 A | 11/1988 | Schoenherr | |
| D299,652 S | 1/1989 | Taylor | |
| D299,721 S | 2/1989 | Webster et al. | |
| 4,864,809 A | 9/1989 | van der Lely et al. | |
| 4,875,332 A | 10/1989 | Aron | |
| 4,885,991 A | 12/1989 | Borba | |
| 4,914,901 A | 4/1990 | Aron | |
| 4,920,735 A | 5/1990 | Bailey et al. | |
| 4,922,699 A | 5/1990 | Gantzer | |
| 4,926,619 A | 5/1990 | Ungruh et al. | |
| 4,932,197 A | 6/1990 | Allen | |
| 4,947,631 A | 8/1990 | Kuehn | |
| 4,974,407 A | 12/1990 | Rowe et al. | |
| 4,977,734 A | 12/1990 | Rowe et al. | |
| 4,996,833 A | 3/1991 | von Allowerden | |
| 5,062,260 A | 11/1991 | Tonutti | |
| 5,065,570 A | 11/1991 | Kuehn | |
| 5,127,216 A | 7/1992 | Kelderman | |
| 5,149,245 A | 9/1992 | Landmann | |
| 5,155,986 A | 10/1992 | Kelderman | |
| 5,163,277 A | 11/1992 | Fransgaard | |
| 5,199,252 A | 4/1993 | Peeters | |
| 5,231,829 A | 8/1993 | Tonutti | |
| 5,251,431 A | 10/1993 | Shoop | |
| 5,263,306 A | 11/1993 | Tonutti | |
| 5,305,590 A | 4/1994 | Peeters | |
| 5,313,772 A | 5/1994 | Tonutti | |
| 5,337,546 A | 8/1994 | Sieling | |
| 5,377,482 A | 1/1995 | Knigge | |
| 5,404,702 A | 4/1995 | Lewis | |
| 5,479,768 A | 1/1996 | Hettich | |
| 5,493,853 A | 2/1996 | Tonutti | |
| 5,502,959 A | 4/1996 | Hansen | |
| 5,540,040 A | 7/1996 | Peeters | |
| 5,546,739 A | 8/1996 | Hettich | |
| 5,557,859 A | 9/1996 | Baron | |
| 5,586,421 A | 12/1996 | Aron | |
| 5,598,691 A | 2/1997 | Peeters | |
| 5,615,545 A | 4/1997 | Menichetti | |
| 5,685,135 A | 11/1997 | Menichetti | |
| 5,685,136 A | 11/1997 | Aron | |
| 5,791,133 A | 8/1998 | Krone et al. | |
| 5,899,055 A * | 5/1999 | Rowse et al. | 56/377 |
| 6,272,826 B1 | 8/2001 | Menichetti | |
| 6,543,212 B2 * | 4/2003 | Tonutti | 56/375 |

* cited by examiner

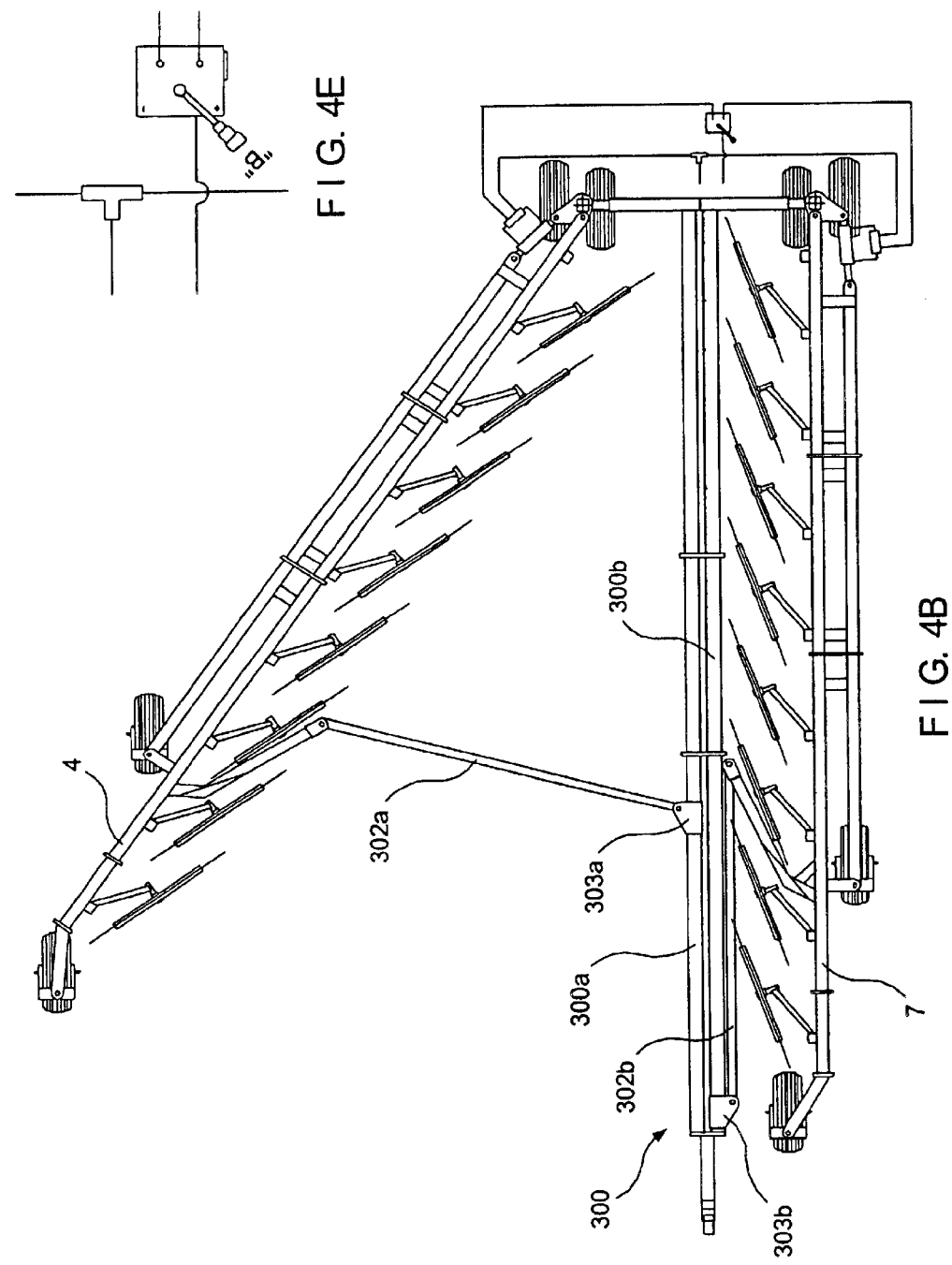

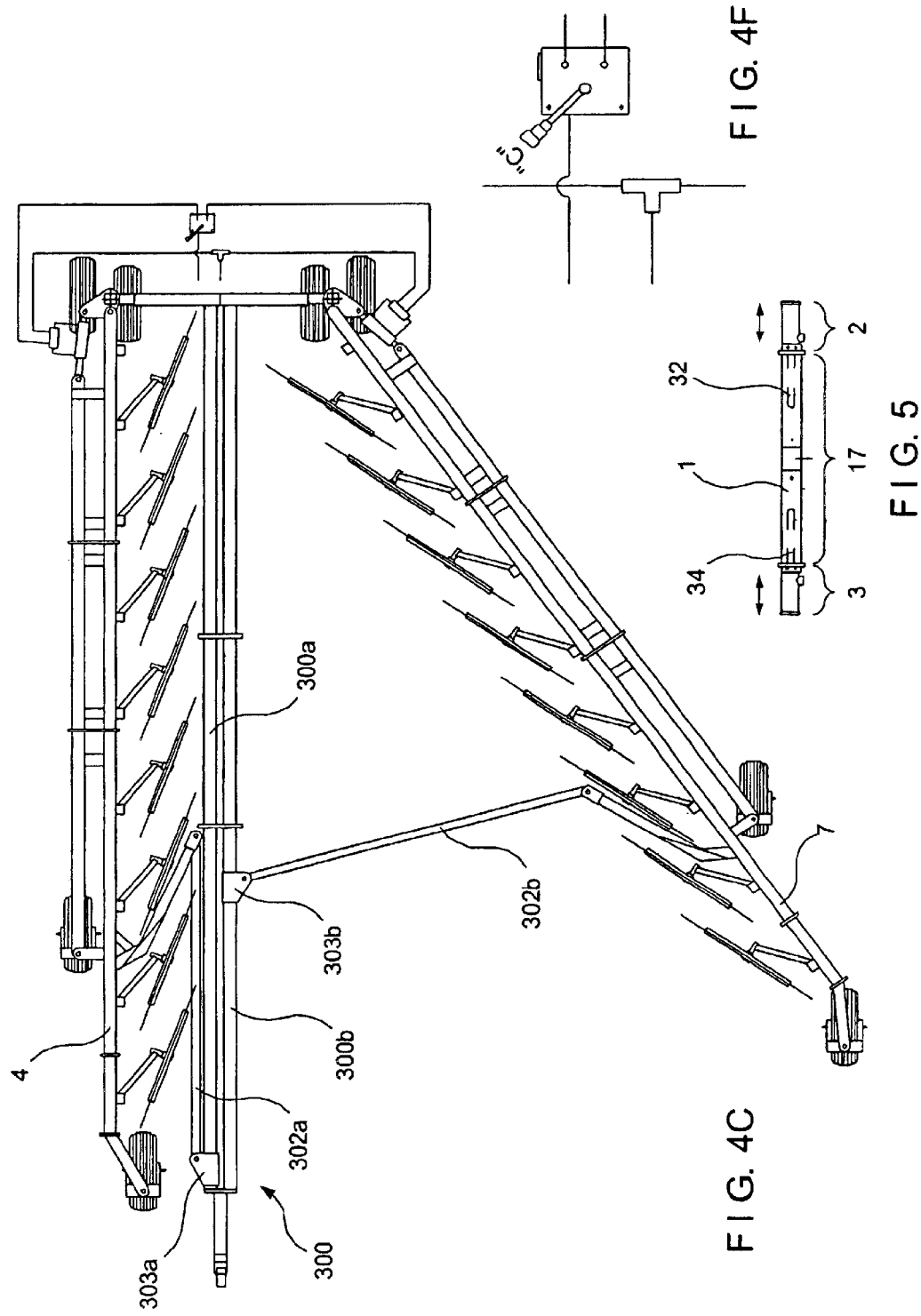

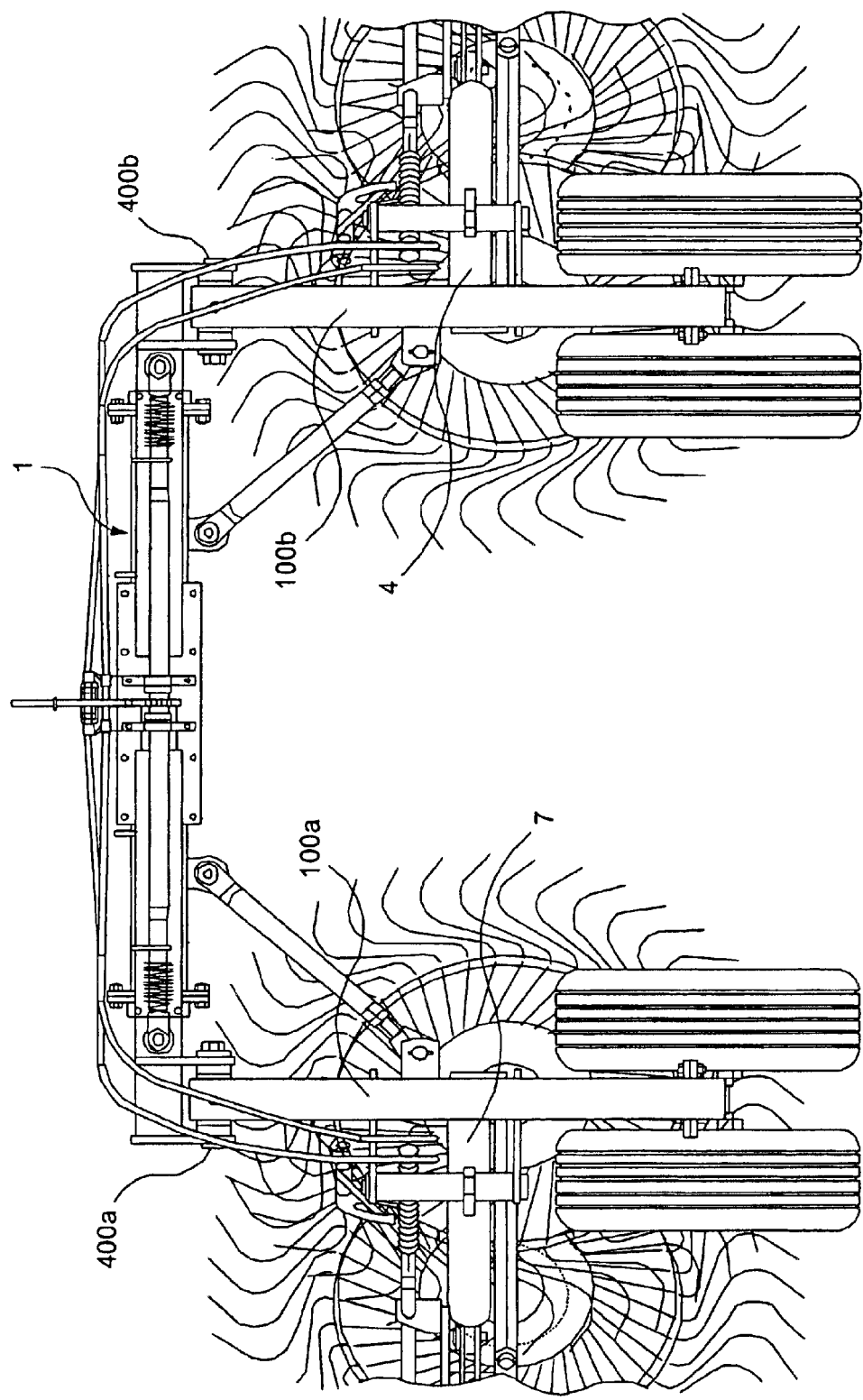
F I G. 16C

TOWABLE HAY RAKE WITH AN AUTOMATIC STEERING MECHANISM

CROSS-REFERENCE TO RELATED APPLICATIONS

The present application incorporates herein each of the following references as fully as if set forth in their entirety: U.S. patent application Ser. No. 10/177,303, filed on Jun. 21, 2002; U.S. patent application Ser. No. 09/094,074, filed on Jun. 9, 1998, which issued as U.S. Pat. No. 6,000,207 on Dec. 14, 1999; and U.S. patent application Ser. No. 08/594,615, filed on Feb. 2, 1996, which issued as U.S. Pat. No. 5,685,135 on Nov. 11, 1997.

BACKGROUND OF THE INVENTION

1. Field of the Invention

The present invention relates to an automatic steering apparatus for a hay rake, such as a collapsible pull type V-shaped rake for gathering hay.

2. Background Art

Hay rakes, such as V-shaped hay rakes having two movable arms which carry multiple rake wheels, are typically moved and operated by means of a towing vehicle, such as a tractor. For instance, a hay rake is usually equipped at its front end with a coupling element, e.g., an eyelet, for attaching to a corresponding coupling element on the towing vehicle. Typically, the towing vehicle, when coupled to the hay rake, provides motive power for towing the hay rake, so as to eliminate the need for the hay rake to have motive power of its own. In addition, the towing vehicle is typically steerable, while the hay rake is not. It is usually deemed sufficient that the steering of the towing vehicle will provide adequate steerability of the hay rake being towed therebehind. However, hay rakes are often very large devices. Thus, a hay rake may travel a considerable distance before it changes its direction of travel in response to a change in the towing direction of the towing vehicle. This considerable distance may be undesirably large Therefore, there is a need for a towable hay rake having improved maneuverability.

SUMMARY OF THE INVENTION

The present invention, according to one embodiment, relates to a hay rake towable by a towing vehicle. The hay rake includes a front portion, such as a separate carriage section, connectable to the towing vehicle. In addition, the hay rake includes at least one wheel, but preferably two wheels, mounted to, e.g., a rear end, of the hay rake. The hay rake also includes an automatic steering mechanism. The automatic steering mechanism is coupled to the front portion of the hay rake and is configured to be actuated by a change in towing direction of the towing vehicle. The automatic steering mechanism is further configured upon actuation to steer the at least one wheel. According various embodiments, the automatic steering mechanism may be configured to steer any wheels of the hay rake, regardless of the position of the wheels on the hay rake.

According to one embodiment of the present invention, the automatic steering mechanism comprises at least one rotatable element and at least one longitudinally-movable element configured to rotate and/or move upon a change in towing direction of the hay rake. The rotatable element and the longitudinally-movable element are coupled to and configured to cause a first cross member, which is coupled to the wheels of the hay rake, to move in a direction corresponding to the change in towing direction of the hay rake. Advantageously, the wheels of the hay rake are mounted on opposite, e.g., left and right, sections of a second cross member at a rear end of the hay rake. The first and second cross members may be extendible and retractable, preferably in synchronous fashion, by hydraulics or manually. In one embodiment, left and right sections of the first and second cross members are extendible and retractable by corresponding dual action hydraulic actuators, the operation of each dual action hydraulic actuator being controlled by a power divider valve that is configured to divide an actuating hydraulic fluid between the first and second hydraulic actuators. The dual action hydraulic actuators may also be coupled to stop valves that block movement of the corresponding hydraulic actuators when actuating hydraulic fluid is not being supplied to the corresponding hydraulic actuators.

BRIEF DESCRIPTION OF THE DRAWINGS

The invention will now be described in greater detail with reference to the accompanying drawings, a brief description of which follows:

FIGS. 4A to 4F show one embodiment of a hydraulic control system which may be employed to open and close both of the hay rake arms simultaneously or individually;

FIG. 5 is a top plan view of an embodiment of the crosswise member of the towable hay rake of the present invention;

FIGS. 16A to 16C show side and rear views of yet another embodiment of the towable hay rake of the present invention;

DETAILED DESCRIPTION OF THE INVENTION

For ease of reference the same reference numbers are used to designate the same or corresponding elements throughout the Figures.

Figure 1:
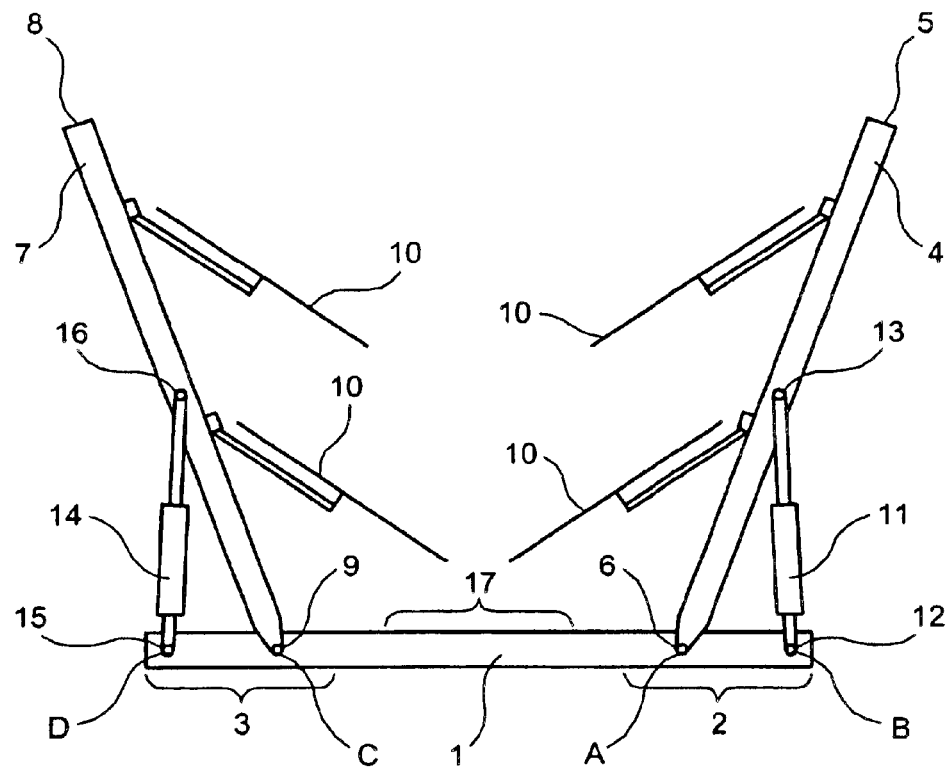
FIG. 1 is a top plan view of one embodiment of the towable hay rake of the present invention.

Referring to FIG. 1, one exemplary embodiment of the rake of the invention includes a wheeled crosswise member 1. The crosswise member 1 has a right section 2 and a left section 3. A first rake arm 4 having a front end 5 and a back end 6 is pivotably mounted at its back end 6 to the right section 2 of the crosswise member 1 so as to be moveable between an open position and a closed position. The position depicted in FIG. 1 is an intermediate position between the open position and the closed position. A second rake arm 7 having a front end 8 and a back end 9 is pivotably mounted at its back end 9 to the left section 3 of the crosswise member 1 so as to be moveable between an open position and a closed position. As with the first rake arm 4, the second rake arm 7 is depicted in FIG. 1 in an intermediate position between the closed position and the open position. A plurality of rotatable haymaker wheels 10 are mounted to each of the first and second rake arms 4 and 7. A first double acting actuator 11 has a first section 12 connected to the right section 2 of the crosswise member 1 and a second section 13 connected to the first rake arm 4. The reference character 14 designates a second double acting actuator. The second double acting actuator 14 has a first section 15 connected to the left section 3 of crosswise member 1 and a second section 16 connected to the second rake arm 7. When actuators 11 and 14 are actuated such that their respective first and second sections 12, 13 and 15, 16 are extended, the first and second rake arms 4 and 5 move from the open position depicted in FIG. 1 towards the closed position, in which the hay rake is easy to transport and maneuver. When actuators 11 and 14 are activated such that their respective first and second sections 12, 13 and 15, 16 are retracted, the rake arms 4 and 7 move toward the open position. Actuators 11 and 14 may be activated simultaneously or independently of each other. In this way rake arms 4 and 7 may be moved from the open position to the closed position and back, and to all incremental positions therebetween and back.

The arrangement of the first and second actuators 11 and 14 between right and left sections 2 and 3 of the crosswise number 1 and the respective first and second rake arms 4 and 7 advantageously allows for the use of only one actuator 11, 14 for each of the first and second rake arms 4 and 7 without any moving parts between the first and second actuators 11 and 14 and the respective first and second rake arms 4 and 7. Due to the fact that the first and second actuators 11 and 14 are directly connected to the crosswise member 1 and the first and second rake arms 4 and 7, the number of moving parts is minimized. In addition to that, only three joints are employed for each side, e.g., for each rake arm of the first and second rake arms 4 and 7. For the right side, e.g., for the first rake arm 4, there is one joint between the first rake arm 4 and the right section 2 of the crosswise member 1, there is a second joint between the first section 12 of the first actuator 11 and the right section 2 of the crosswise member 1 and there is a third joint between the second section 13 of the first actuator 11 and the first rake arm 4. The same arrangement may be employed for the left side. This allows for a simple and stable arrangement of the hay rake which is easy to manufacture and easy to maintain. Furthermore, due to the connection of the first sections 12 and 15 of the first and second actuators 11 and 14 at a greater distance from the center section 17 than the connection of the first and second rake arms 4 and 7, the first and second actuators 11 and 14 may have minimized dimensions with respect to their operating range and their power. For the purposes of clarity only, the hay rake illustrated in FIG. 1 is shown without a towbar. However, it should be understood that a towbar, various different embodiments and configurations of which are described hereinbelow, maybe employed to pull the hay rake.

Figure 2:
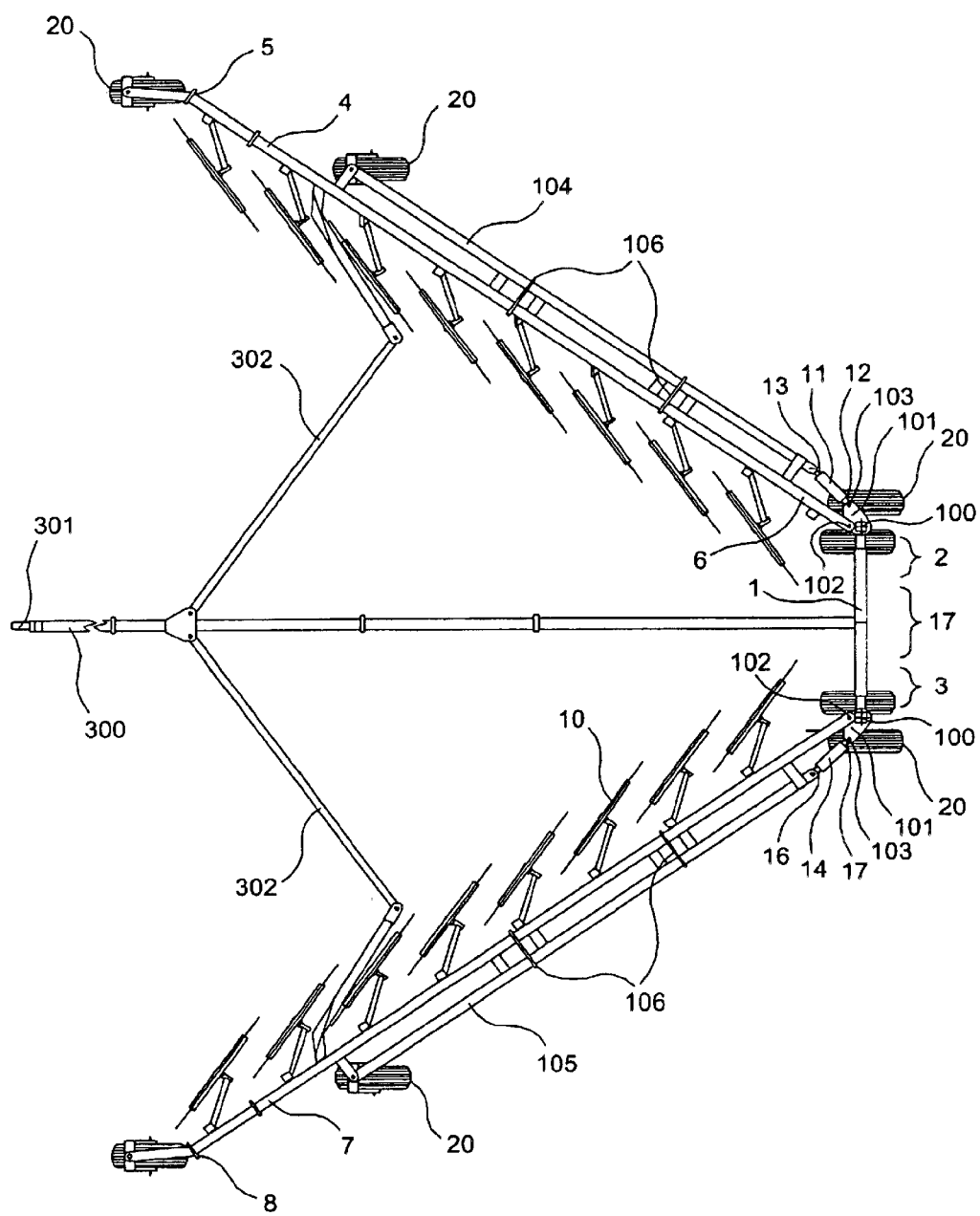
FIG. 2 shows a top plan view of another embodiment of the towable hay rake according to the present invention.

FIG. 2 shows another exemplary embodiment of the hay rake of the present invention. In FIG. 2, a towable hay rake includes a wheeled crosswise member 1 to which are connected right and left rake arms 4 and 7. Right and left sections 2 and 3 of the crosswise member 1 include right and left supports 100 to which wheels are attached. In the exemplary embodiment depicted in FIG. 2, the supports 100 are rectangular rods. Right and left triangular support plates 101 are respectively attached to the supports 100. On each of the support plates 101, there is a pivot 102. The rake arms 4 and 7 are attached to the pivots 102, so that the rake arms 4 and 7 can pivot around the pivots 102. Furthermore, each support plate 101 has another pivot 103 connected to first and second actuators 11 and 14 which are connected to push rods 104 and 105. The first and second actuators 11 and 14 deploy the rake arms 4 and 7. The pivots 103 are placed adjacent to pivots 102 on the support plate 101, but may be also placed at any location that affords sufficient leverage to move the rake arms 4 and 7. The first and second actuators 11 and 14 are preferably dual action hydraulic actuators which may be operated jointly or alone, depending on whether one or both rake arms 4 and 8 must be opened or closed.

Push rods 104 and 105 are respectively connected to the rake arms 4 and 7 by means of a plurality of attachment elements 106. A plurality of haymaker wheels 10 are attached to rake arms 4 and 7, so that they can rotate to collect the hay. Wheels 20 are attached to rake arms 4 and 7 as well as to the crosswise member 1.

Figure 6:
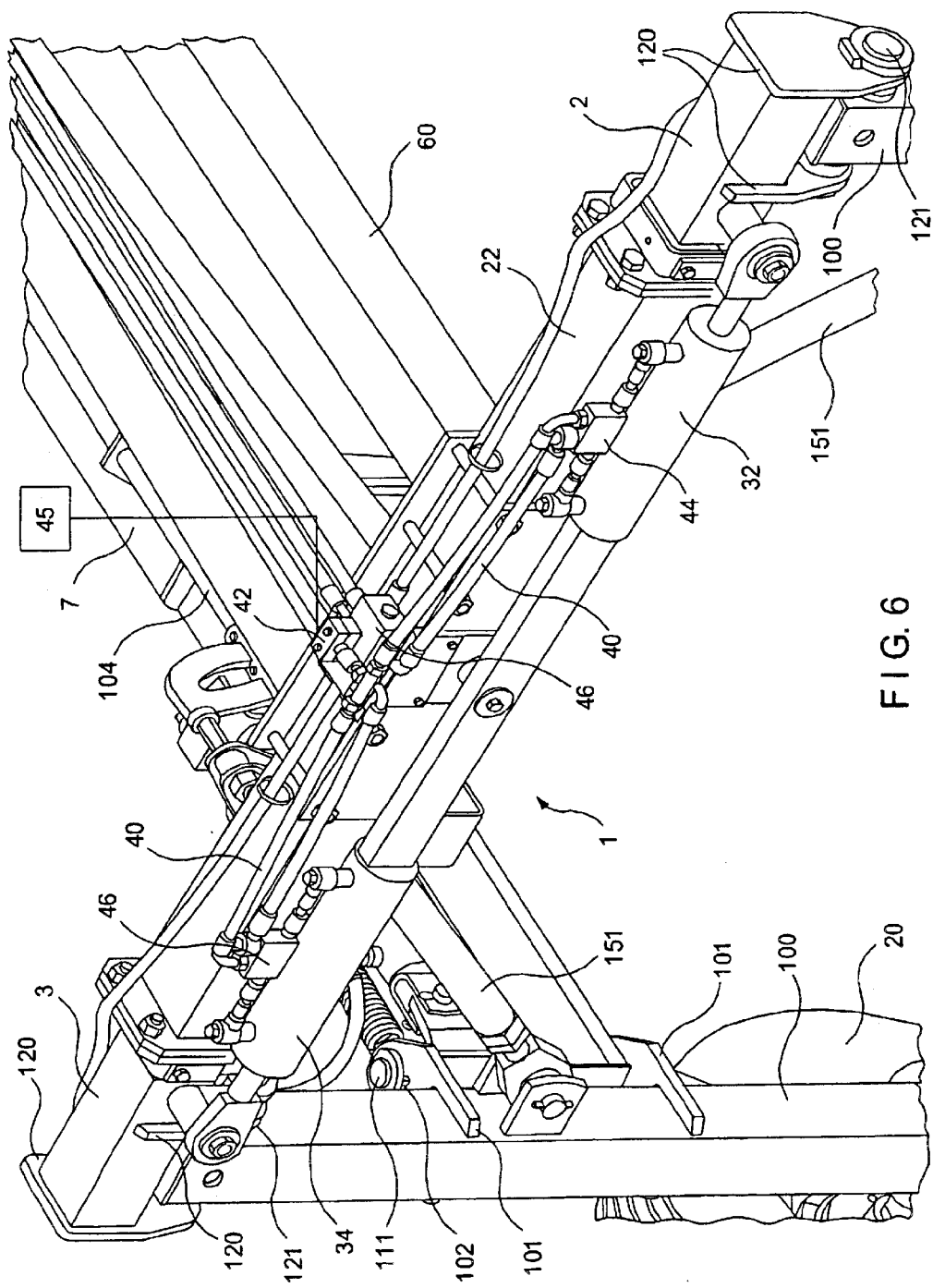
FIG. 6 shows a perspective view of an embodiment of the towable hay rake of the present invention.

As mentioned above, the actuators 11 and 14 are preferably dual action, so that they can extend and retract the component to which they are connected. In the depicted exemplary embodiment, the actuators 11 and 14 are hydraulic cylinders operated by fluid pressure. However, the actuators may also be manually operable, for example by a hand crank. A connection between the crosswise member 1 and the supports 100 may be the same as shown in FIG. 6, which is discussed in greater detail below.

Figure 2A:
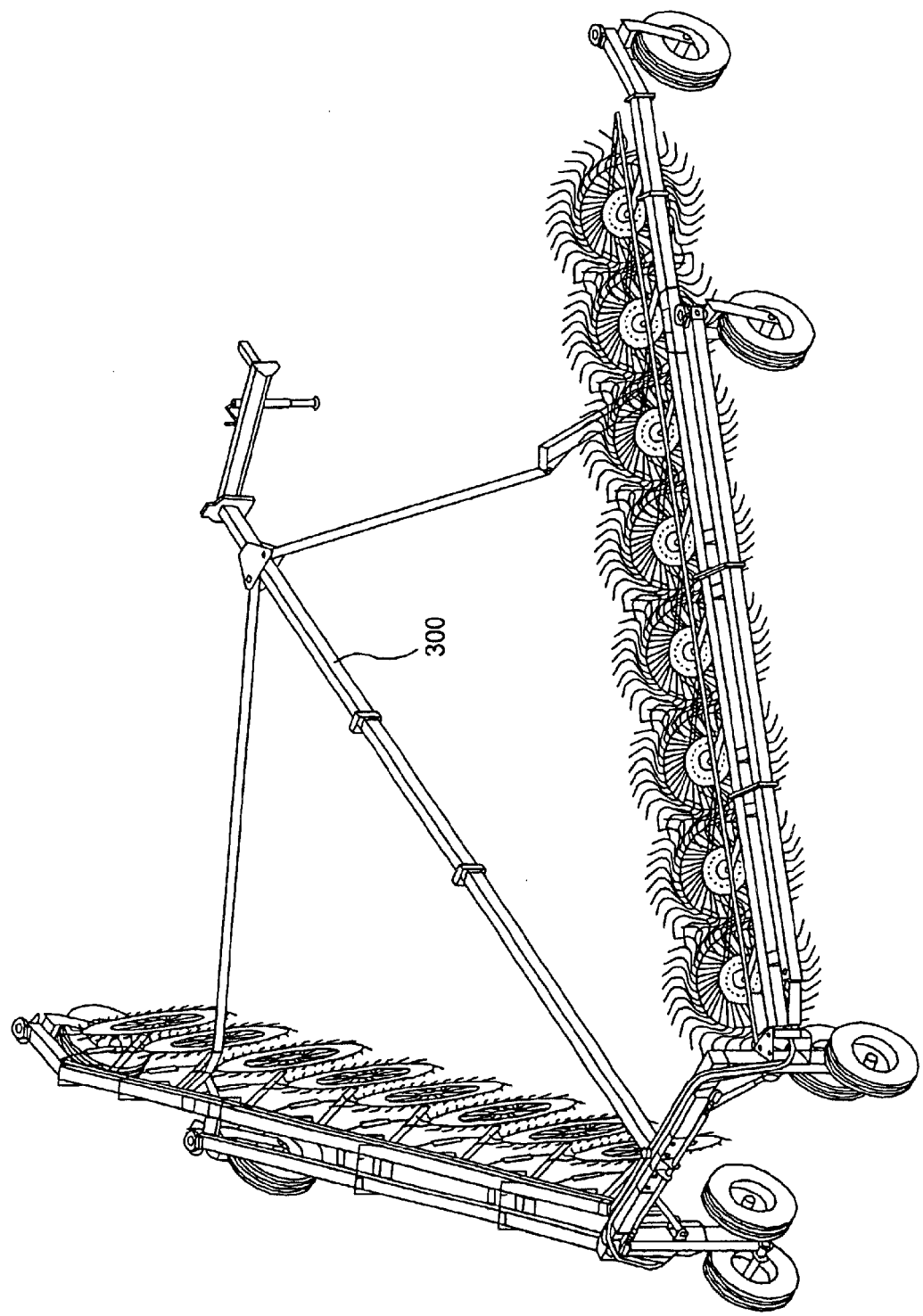
FIG. 2A shows a perspective view of another embodiment of the towable hay rake according to the present invention.

In addition, FIG. 2 illustrates one example of a towbar 300 having an eyelet 301 or other type of connection element for enabling the hay rake to be towable. Various types of towbars may be employed to tow the hay rake, some of which are described in further detail hereinbelow, and the present invention is not intended to be limited to only a single type or configuration of towbar. In the embodiment shown, towbar 300 includes a pair of stabilization elements 302 that assist in stabilizing the hay rake arms 4 and 7. Again, various types of stabilization elements may be employed to stabilize the hay rake arms 4 and 7 of the hay rake, some of which are described in further detail hereinbelow, and the present invention is not intended to be limited to only a single type or configuration of stabilization element. FIG. 2A illustrates the hay rake of FIG. 2 in the perspective view.

Figure 3:
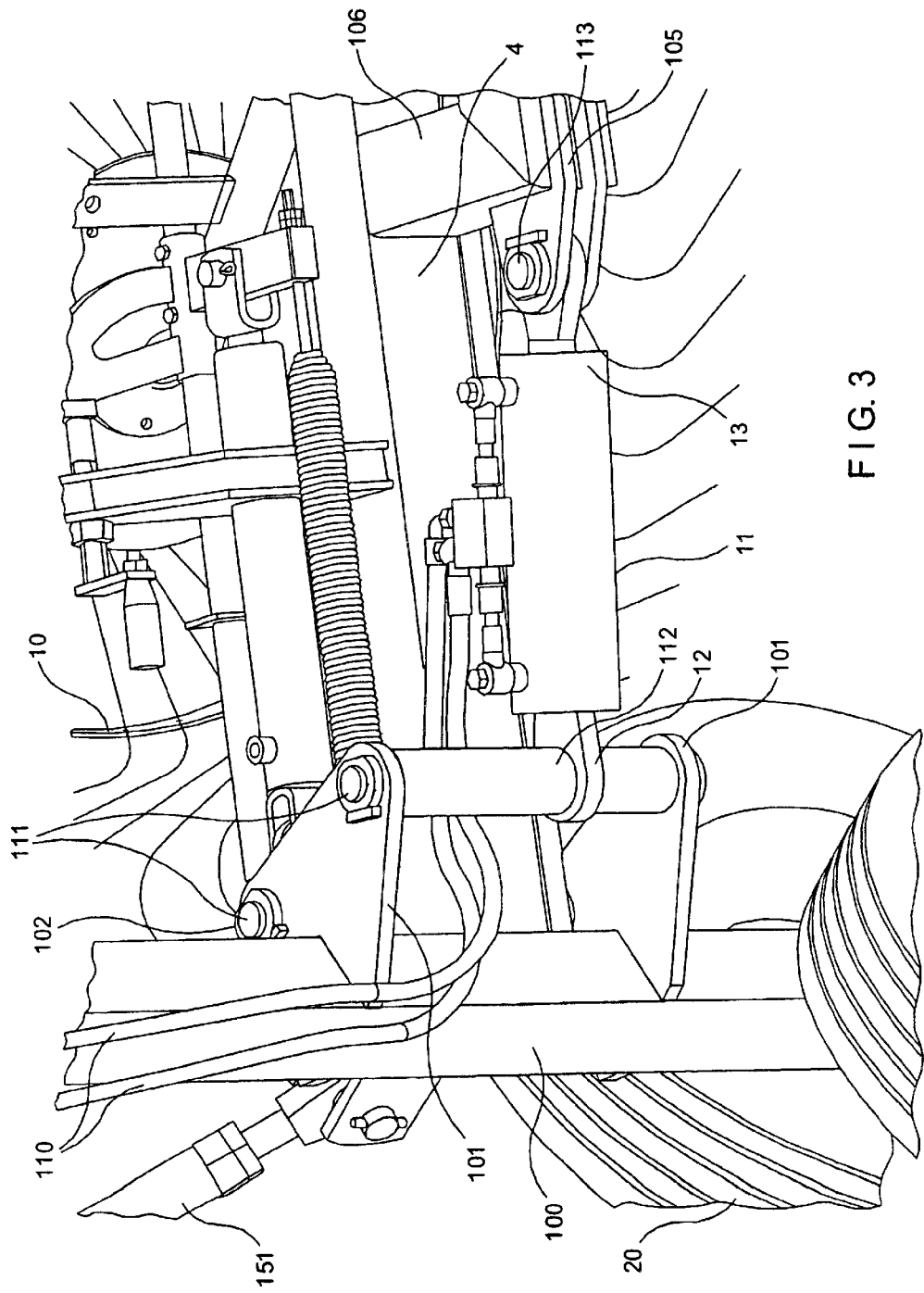
FIG. 3 shows a perspective view of a detail of the right section of the crosswise member of FIG. 2.

FIG. 3 shows a detailed view of the right section 2 of the crosswise member 1 of FIG. 2 with the support 100. In FIG. 3, two wheels 20 are attached to support 100. There are two support plates 101 (an upper support plate and a lower support plate) attached to the support 100 at a location above the wheels 20 and underneath the crosswise member 1, which is outside the view of FIG. 3. The support plates 101 are attached to the support 100, e.g., by a welding connection. The support plates 101 are attached to the support 100 such that a main plane of the support plates is parallel to the ground when the hay rake is in operation. The support plates 101 are disposed from each other at a distance such that the end 6 of the rake arm 4 (the right rake arm of the hay rake) to be connected to the right section 2 of the crosswise member 1 (to the support plate 101 and therewith to the support 100 and therewith to the crosswise member 1) fits between the two support plates 101. The rake arm 4 is attached to the support plates 101 by means of a shaft 111 which is received in openings in the upper support plate 101 and the lower support plate 101, and which sits in an opening in the rake arm 4. Pivot 102 is thus formed, allowing the rake arm 4 to rotate around the shaft 111 of the pivot 102.

At a distance from the shaft 111, there are provided further openings in the upper and lower support plates 101. In these further openings, there is provided a further shaft 112 to form the pivot 103. Attached to the shaft 112, there is the first section 12 of the first actuator 11. The second section 13 of the first actuator 11 is connected by means of a hinge 113 to the push rod 104 which is connected to the rake arm 4 by means of the attachment elements 106. As shown, e.g., in FIG. 2, a plurality of attachment elements 106 may be provided. Furthermore, there are provided hydraulic lines 110 which are connected to the first actuator 11 which is a dual action hydraulic cylinder in this exemplary embodiment.

In the exemplary embodiment shown in FIG. 3, when the first actuator 11 is actuated by providing a hydraulic fluid pressure to the first actuator 11 via the hydraulic lines 110, the right rake arm 4 is swivelled around the shaft 111 of the pivot 102. The attachments of the left and right rake arms 4 and 7 to the crosswise member 1 preferably have the same configurations.

Figure 4:
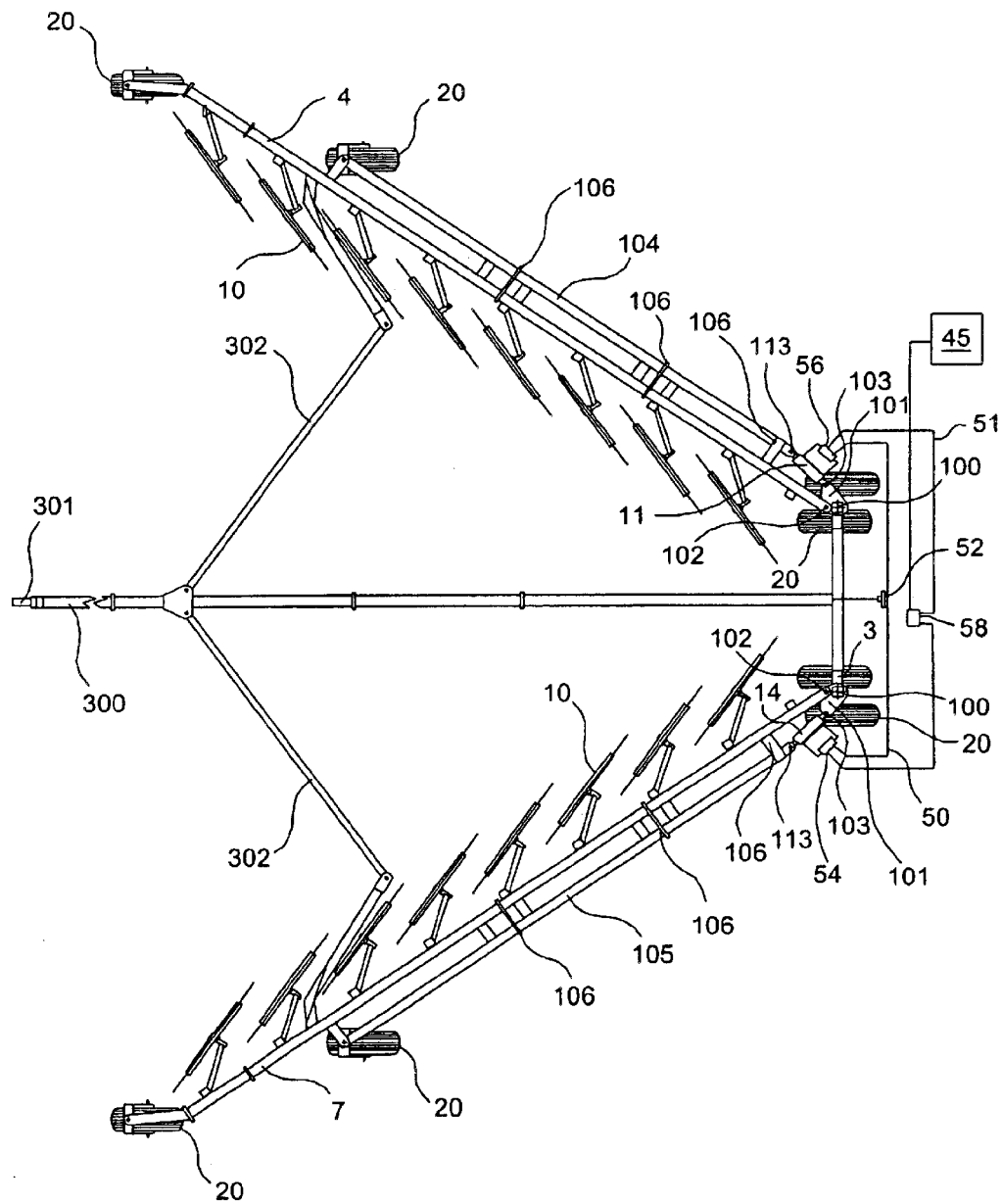
FIG. 4 shows one embodiment of a hydraulic system which may be applied in the hay rake of the present invention.

An exemplary embodiment of a hydraulic control system for first and second actuators 11 and 14 will now be described with reference to FIG. 4, which may be used in any of the embodiments described in this application. A hydraulic power divider 52 divides the hydraulic fluid flow provided via hydraulic lines 110 from a hydraulic pressure source that is not shown in FIG. 4 between first and second actuators 11 and 14. Hydraulic shutoff valves 56, 54 are connected respectively to the first and second actuators 11 and 14, and are used to shut off the flow to those actuators 11 and 14, to lock the movement of the first and second actuators 11 and 14 when pressurized hydraulic fluid is not supplied or when the pressure of the hydraulic fluid is not sufficient to effectively actuate the first and second actuators 11 and 14. In one embodiment of the present invention, hydraulic shut off valves 54, 56 are automatic. However, in an alternative of this exemplary embodiment, hydraulic shutoff valves 54, 56 are activated whenever the pressure in the hydraulic lines 51 falls below a predetermined level, or may be manually operated whenever the operator wants to lock one or both of the first and second actuators 11 and 14. Further, for example, control unit 45 may be provided to control an operation of these, or any other, valves provided in the hay rake. Again, FIG. 4 illustrates a towbar 300 having an eyelet 301 and a pair of stabilization elements, although any type of tow arrangement may be employed.

Figures 4A, 4D:
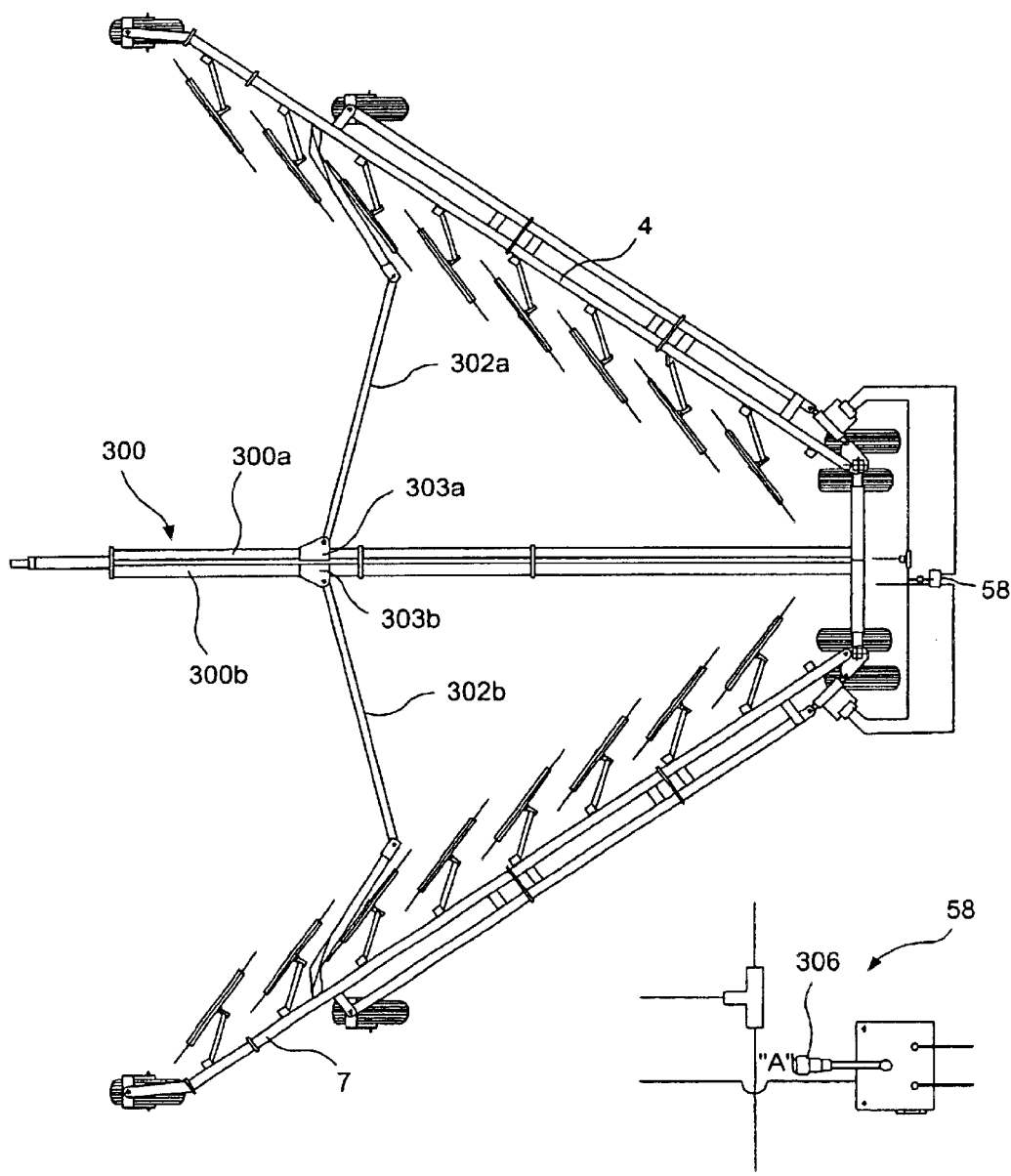

FIGS. 4A to 4E illustrate a hydraulic control arrangement that may be employed, in accordance with one embodiment of the present invention, in order to simultaneously or independently actuate the hay rake arms. It should be understood that the hydraulic control arrangement described hereinbelow may be employed to operate any type of rake having an opening mechanism that employs two hydraulic cylinders. According to this embodiment, a hydraulic controller 58 is provided that employs a hydraulic flux divider and a valve in order to selectively control the actuation of the actuators 11 and 14, and to thereby control the opening and closing of the hay rake arms 4 and 7. The hydraulic controller 58 includes a selector handle 306, which may alternatively be a switch, dial or any other type of instrument actuatable by an operator, that enables an operator to select between various, e.g., three, positions. For instance, FIG. 4D shows the hydraulic controller 58 having the selector switch in a first position labeled A. In the position labeled A, the hydraulic controller 58 is configured to actuate both hay rake arms 4 and 7 simultaneously, as is illustrated in FIG. 4A. FIG. 4A shows that, in a preferred arrangement of this embodiment, the towbar 300 includes first and second towbar rods 300a and 300b. On each of the towbar rods 300a and 300b is slideably mounted a respective connection element 303a and 303b. The connection elements 303a and 303b are rotatably coupled to first and second stabilization elements 302a and 302b, respectively. When actuated simultaneously, as illustrated in FIG. 4A, the connection elements 303a and 303b slideably travel in tandem along their respective towbar rods 300a and 300b.

FIG. 4E shows the hydraulic controller 58 having the selector switch in a second position labeled B. In the position labeled B, the hydraulic controller 58 is configured to actuate the hay rake arm 4 independently of the hay rake arm 7, as is illustrated in FIG. 4B. FIG. 4B shows that, when the hay rake arm 4 is actuated so as to assume the open position, the connection element 303a slideably traverses along its respective towbar rod 300a, while the connection element 303b corresponding to the hay rake arm 7, which is in the closed position, is parked at an end of its respective towbar rod 300b.

FIG. 4F, on the other hand, shows the hydraulic controller 58 having the selector switch in a second position labeled C. In the position labeled C, the hydraulic controller 58 is configured to actuate the hay rake arm 7 independently of the hay rake arm 4, as is illustrated in FIG. 4C. FIG. 4C shows that, when the hay rake arm 7 is actuated so as to assume the open position, the connection element 303b slideably traverses along its respective towbar rod 300b, while the connection element 303a corresponding to the hay rake arm 4, which is in the closed position, is parked at an end of its respective towbar rod 300a.

FIG. 5 shows an exemplary embodiment of the crosswise member 1 that may be used in any exemplary embodiment of the invention described in this application. In FIG. 5, the right and left sections 2 and 3 of the crosswise member 1 can telescope in and out of the center section 17 of crosswise member 1. Third and fourth dual action actuators 32, 34 respectively operate right and left sections 2 and 3, to extend and retract them thus changing the track of the towed hay rake. Each of the right and left sections 2 and 3 can be extended alone or together with the other one of the right and left sections 2 and 3, depending on the required configuration of the hay rake.

FIG. 6 shows another exemplary embodiment of the hay rake of the invention including a hydraulic power divider mechanism to divide hydraulic flow (provided by a pressure source which is not shown in FIG. 6) between the third and fourth actuators 32 and 34, which are hydraulic actuators in this exemplary embodiment, and further shows the connection of the crosswise member to the supports 100. The supports 100 are respectively connected to the right and left sections 2 and 3 of the crosswise member 1 by means of appendages 120 respectively provided at the right and left sections 2, 3, and bolts 121 slide through openings in the appendages 120 and the supports 100.

In FIG. 6, there is further provided a power divider valve 42 that is operated by control unit 45. The power divider valve 42 divides the flow between the third and fourth actuators 32, 34. In this exemplary embodiment, the third and fourth actuators 32, 34 are placed adjacent to the crosswise member 1, however, they could be placed in other suitable position. For example, the third and fourth actuators 32, 34 could be placed inside hollow parts of the crosswise member 1. Power divider valve 42 is used to control whether one or both of third and fourth actuators 32, 34 are operated, and whether they are extended or retracted. Hydraulic shutoff valves 44, 46 are associated with the third and fourth actuators 32, 34, and are used to block movement of the corresponding actuator of the third and fourth actuators 32, 34 when pressurized fluid is not provided. This prevents unwanted movement of the right and left sections 2 and 3 of the crosswise member 1. According to one embodiment of the present invention, the hydraulic shutoff valves 44, 46 are automatic. However, in alternatives of this exemplary embodiment, the hydraulic shutoff valves 44, 46 may be operated automatically when the pressure in hydraulic lines 40 is low, when there is no pressure provided, or may be operated by the control unit 45 in response to preselected conditions. In a further alternative of this exemplary embodiment, shutoff valves 44, 46 are manually operated, to manually prevent extension and retraction of the right and left sections 2 and 3. A set of control valves 46, each associated with one of the third and fourth actuators 32, 34, is provided to ensure synchronous and symmetric movement of the third and fourth actuators 32, 34, when such movement is required.

Figure 7:
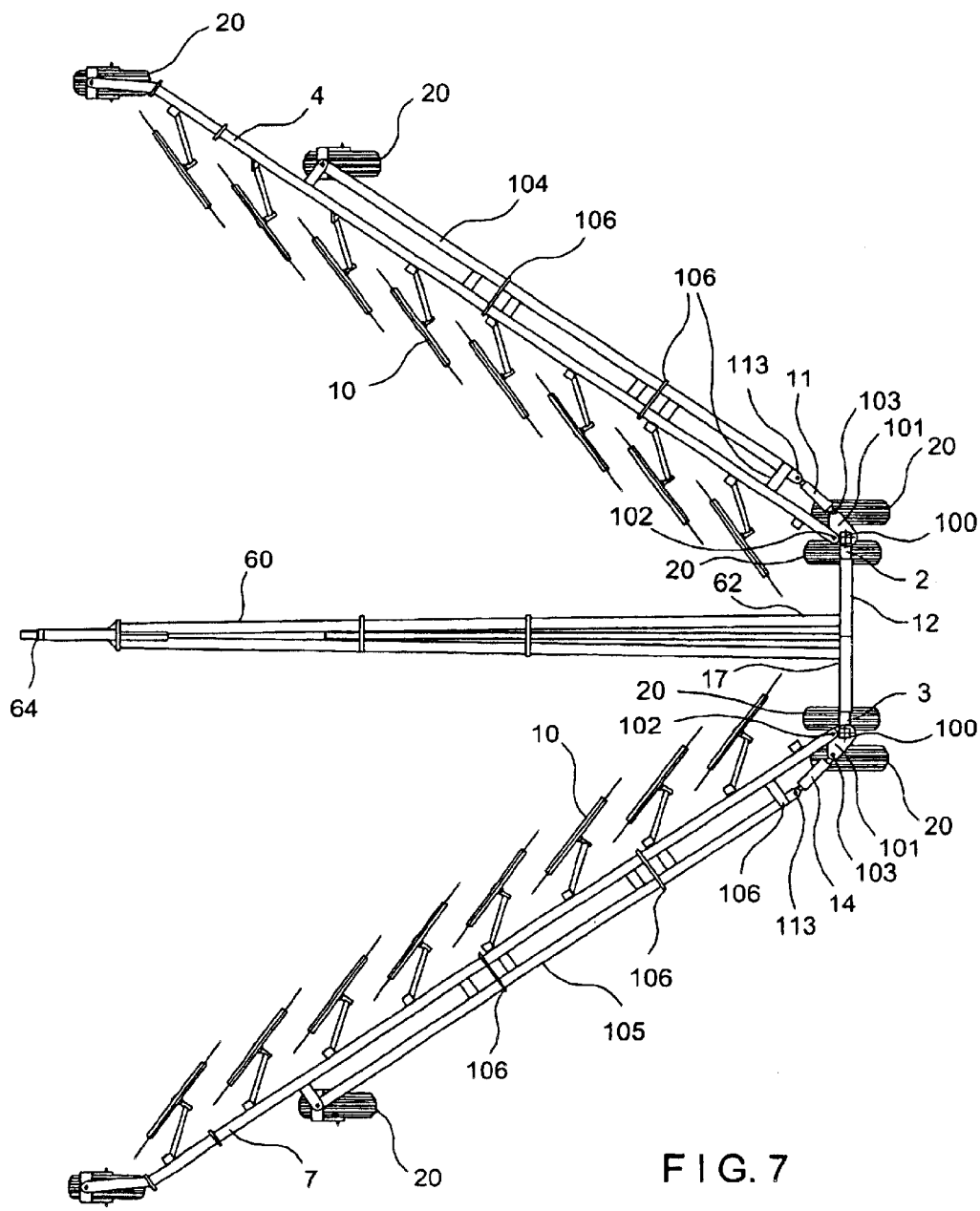
FIG. 7 shows a plan view of another embodiment of the towable hay rake of the present invention.

FIG. 7 shows a further exemplary embodiment of the hay rake according to the present invention. The hay rake shown in FIG. 7 is essentially similar to the hay rake shown in FIG. 2, except that there is provided a longitudinal towing arm 60. The towing arm 60 has one end 62 attached to the center section 17 of crosswise member 1, and another end 64 with appropriate connections such as a towing eyelet to be attached to a towing vehicle such as a tractor.

Figure 8:
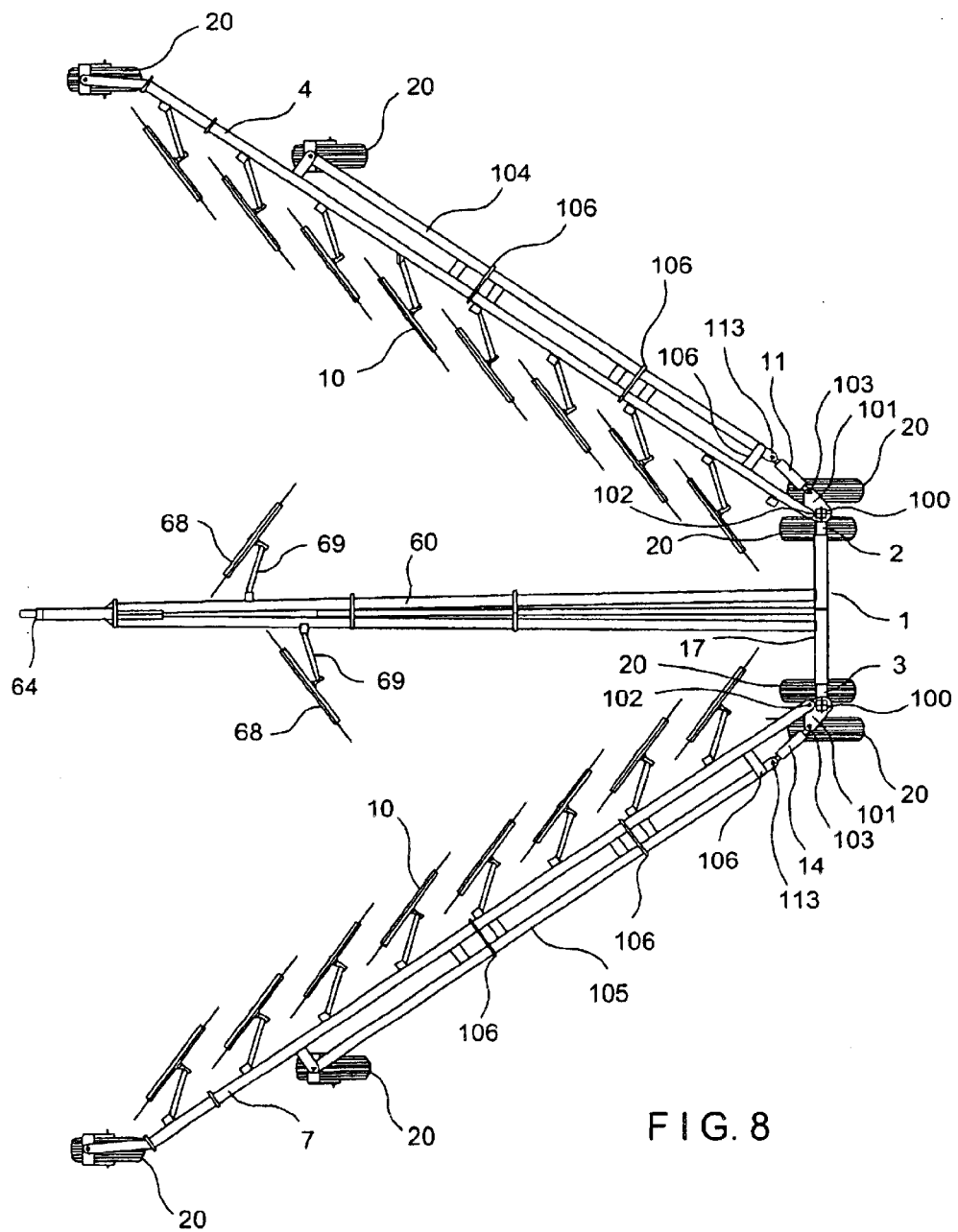
FIG. 8 shows a plan view of another embodiment of the towable hay rake according to another exemplary embodiment of the present invention.
Figure 8A:
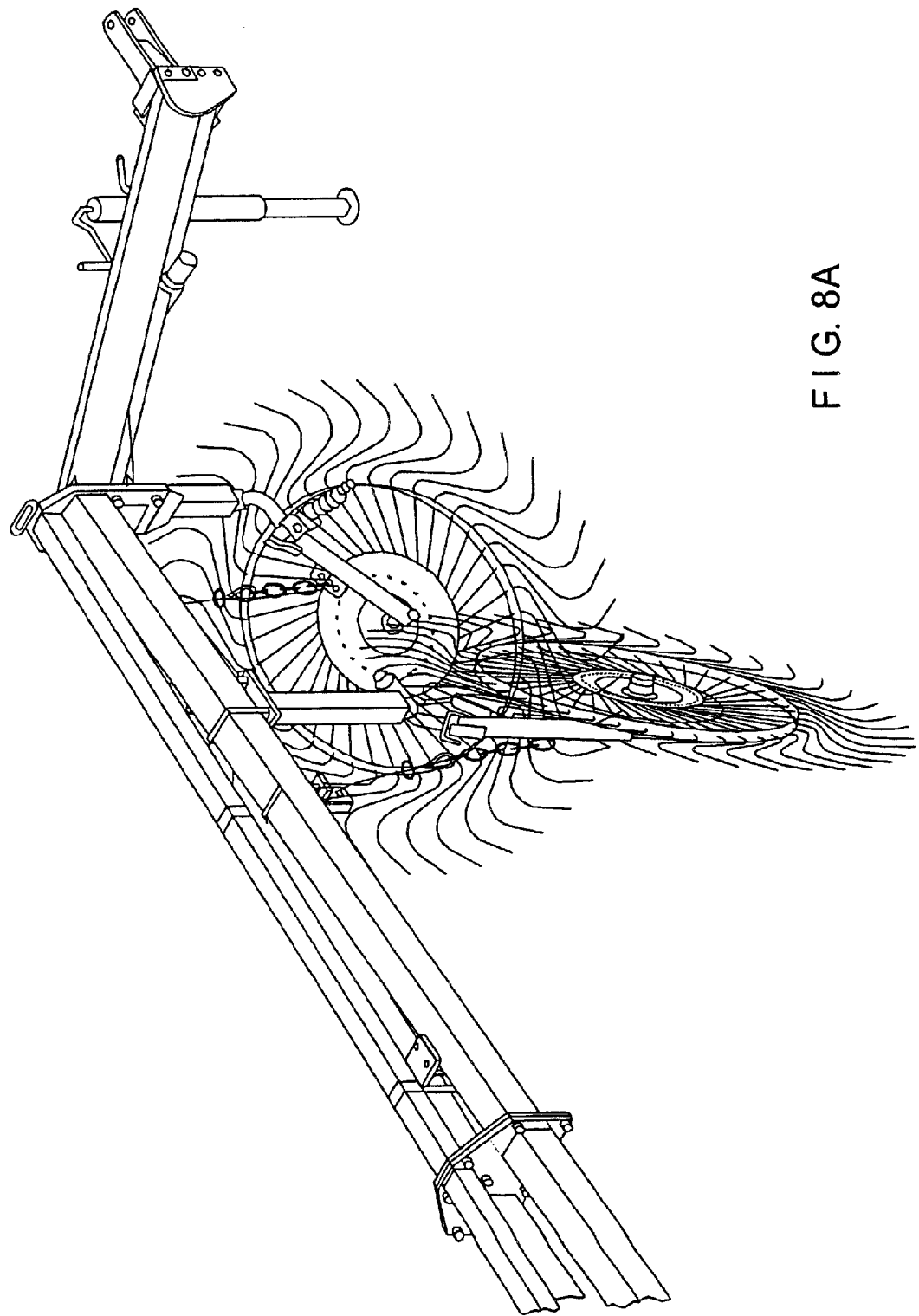
FIGS. 8A and 8B show the towable hay rake of FIG. 8 in an upper and a lower perspective view, respectively.
Figure 8B:
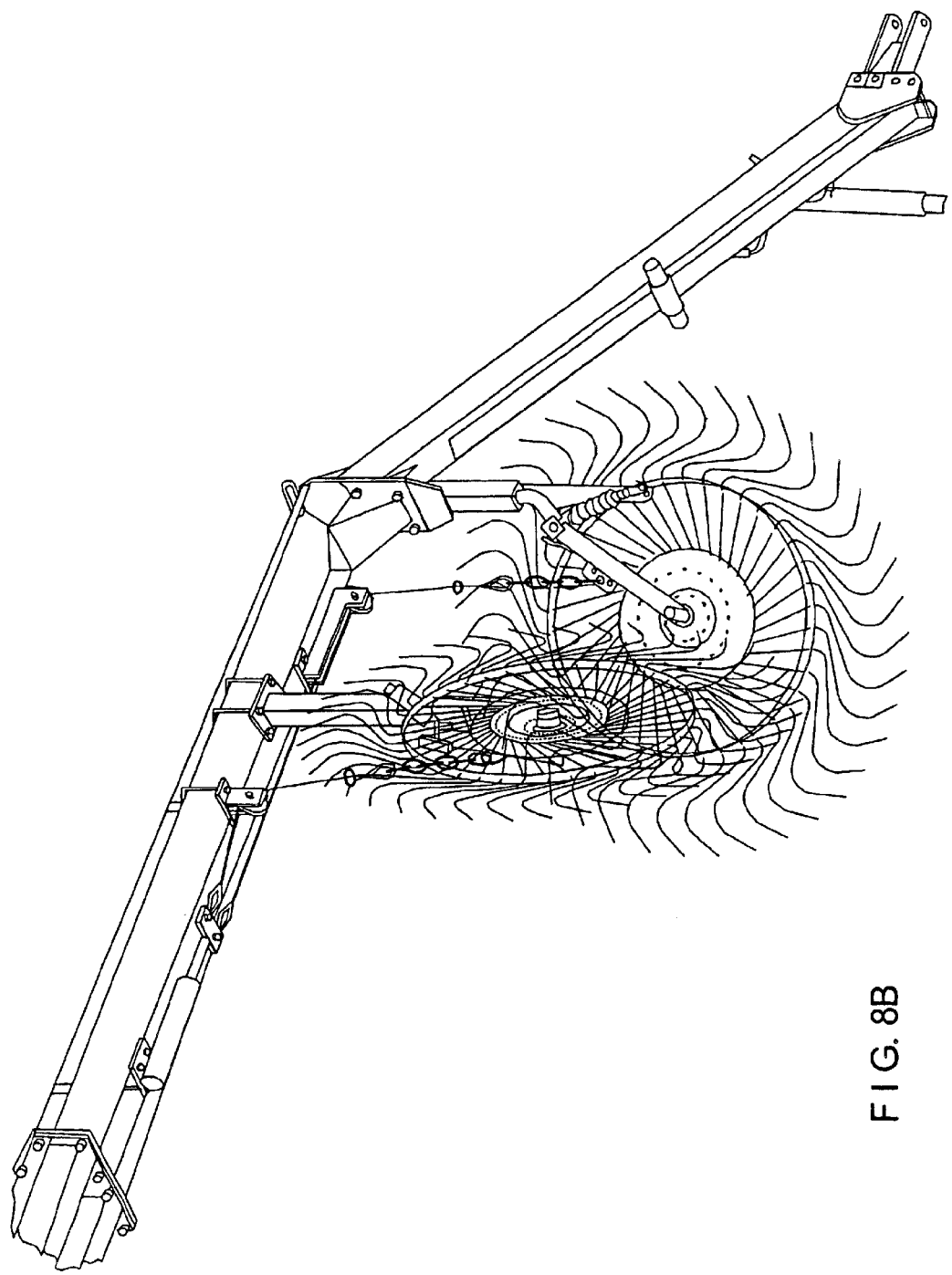

FIG. 8 shows a further exemplary embodiment of hay rake according to the present invention. FIG. 8 shows a towable hay rake essentially similar to the hay rake shown in FIG. 7 with the exception that additional haymaker wheels 68 are attached directly to the towing arm 60. In FIG. 8, there are provided two additional haymaker wheels 68, one on the left side of the towing arm 60 and one on the right side of the towing arm 60. The additional haymaker wheels 68 are attached to levers 69 that are swivel mounted to the towing arm 60 by means of joints such that they may be swivelled from an operating position, where they are extending from the towing arm 60, into a transport position, where they are abutted against the towing arm 60 such that the right and left rake arms 4 and 7 can be pivoted into positions close to the towing arm 60. This exemplary embodiment allows for a very efficient hay raking operation as well as for a small size of the hay rake, when the hay rake is transported from, for example, one field to another. In general, haymaker wheels 10 can be placed on right and left rake arms 4 and 7 facing the respective other rake arm 4 or 7, as shown in the drawings, or can be placed on the opposite side, facing away from the hay rake. In addition, the use of such additional hay making wheels can be employed on any of the types of towbars illustrated herein, as well as on the various parts of the stabilization arrangements illustrated herein. FIGS. 8A and 8B show the additional haymaking wheels 68 in an upper and a lower perspective view, respectively.

Figure 9:
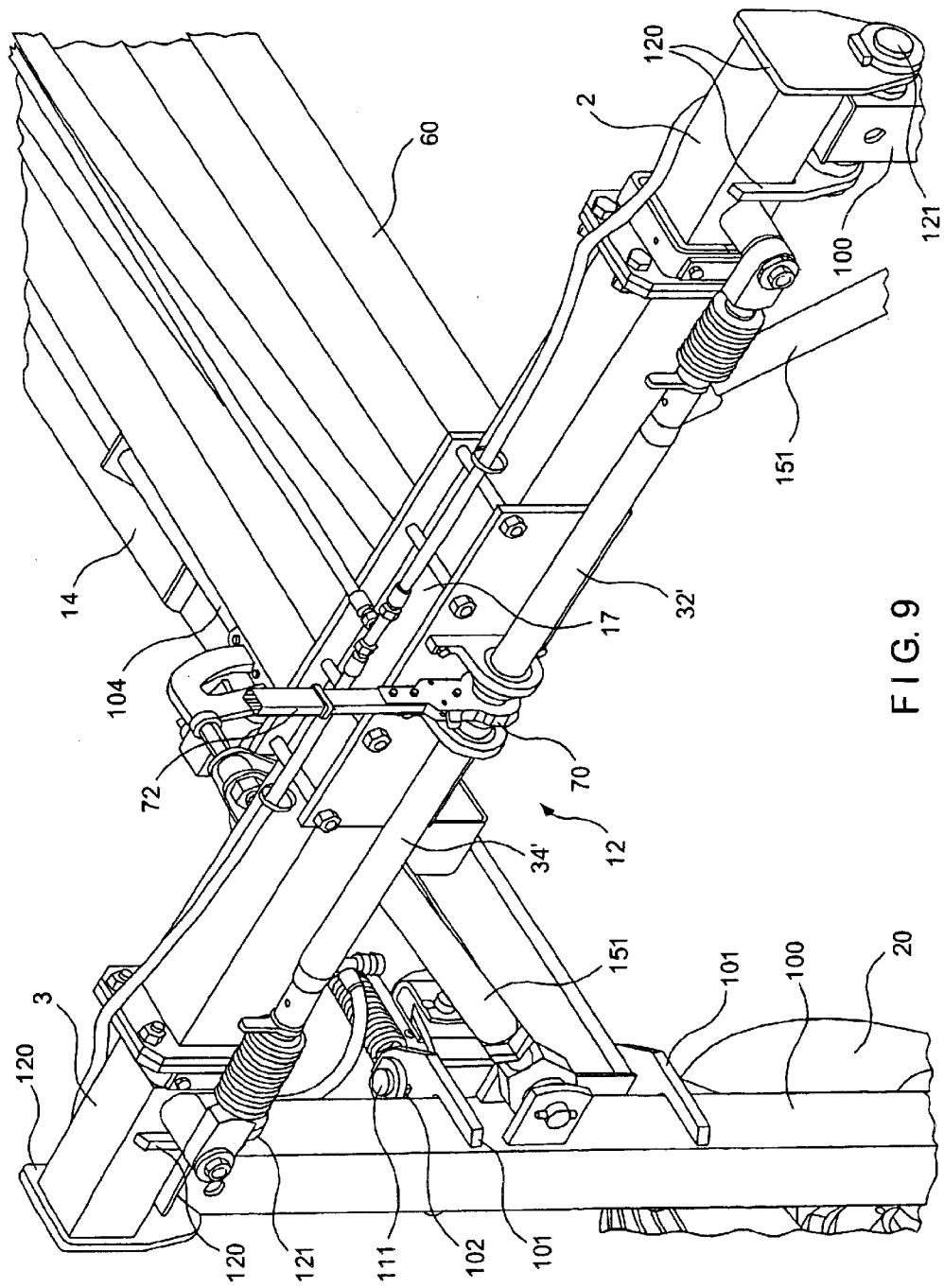
FIG. 9 shows a perspective rear view of an embodiment of the crossbar of the towable hay rake of the present invention.

FIG. 9 shows a further exemplary embodiment of the hay rake according to the present invention. In the exemplary embodiment shown in FIG. 9, crosswise member 1 is fitted with third and fourth actuators 32', 34' that are manually operated. In this exemplary embodiment, third and fourth actuators 32', 34' are dual action screw jacks connected to center section 17 at one end, and respectively to right and left sections 2 and 3 on the other end. In FIG. 9, both screw jacks 32', 34' are actuated by a ratchet mechanism 70 attached to center section 17, which is manually operated by the operator using lever 72. In an alternative of this embodiment, separate levers and ratchets may be used for each actuator 32', 34'.

Figure 10:
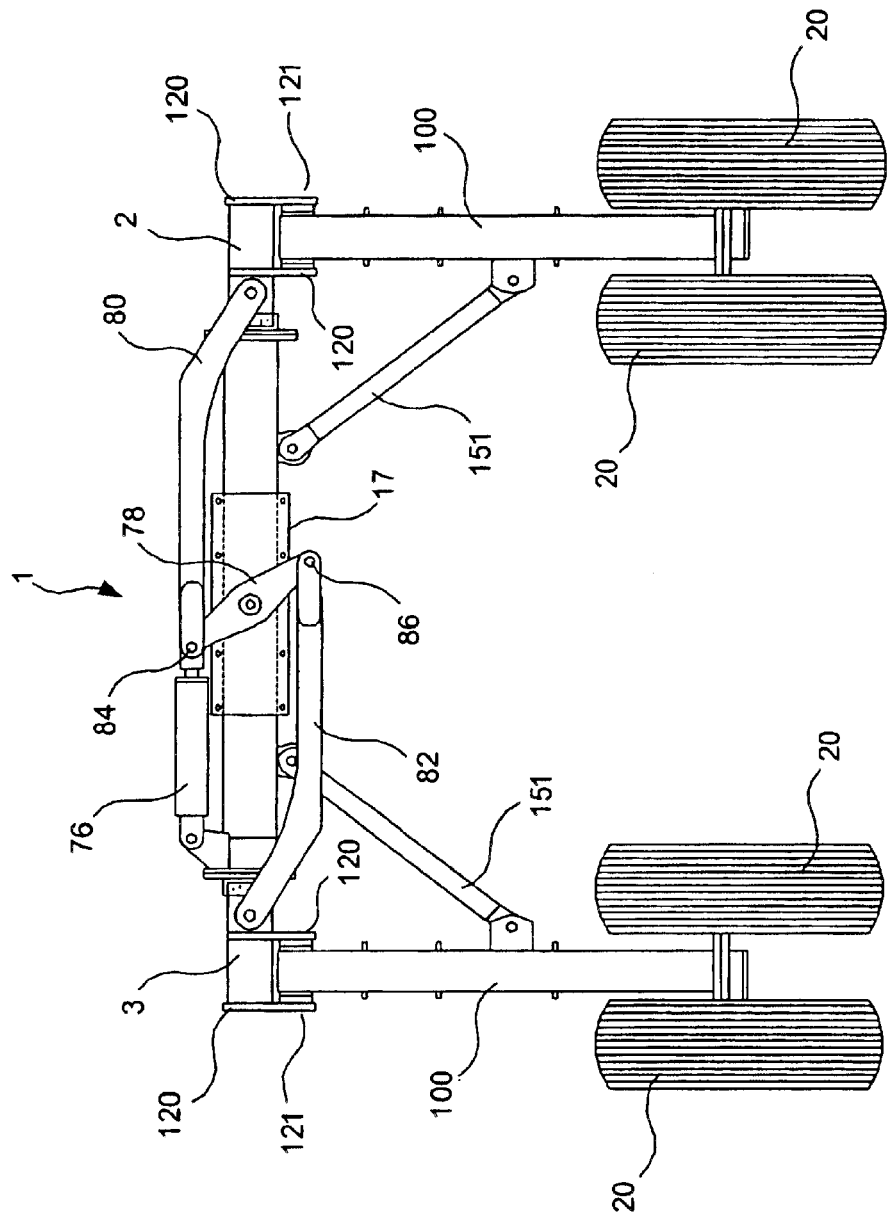
FIG. 10 shows a rear view of an embodiment of the wheeled crossbar of the hay rake of the present invention which is equipped with telescoping cylinders for lengthening and shortening the crossbar and is secured in the narrower position.
Figure 10A:
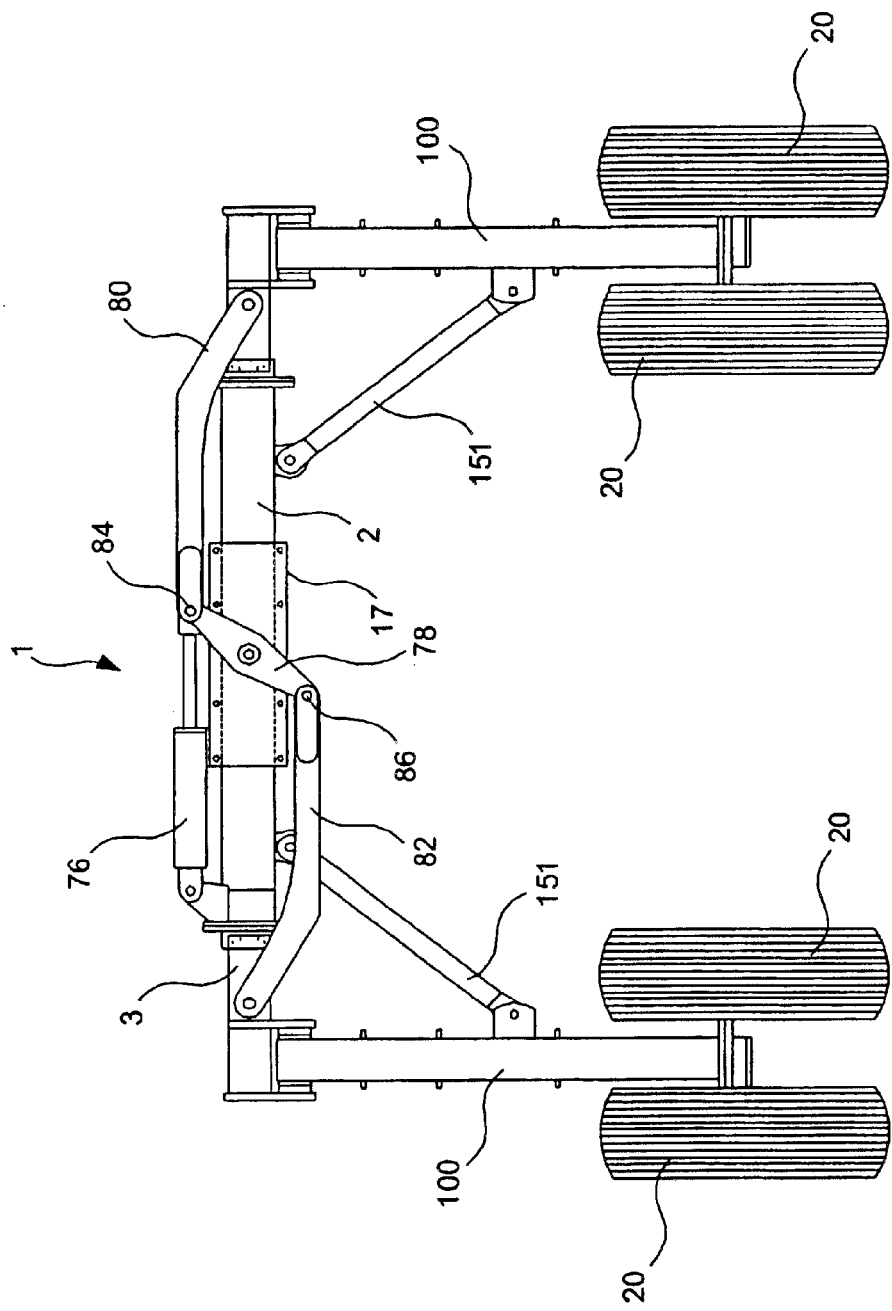
FIG. 10A shows a rear view of an embodiment of the wheeled crossbar of the hay rake shown in FIG. 10, where the telescoping cylinders for lengthening and shortening the crossbar is secured in the wider position.

FIGS. 10 and 10A show an exemplary embodiment of a mechanism for lengthening and shortening the crosswise member 1. The crosswise member 1 is shown in a closed configuration in FIG. 10, and in an open configuration in FIG. 10A. Right and left sections 2 and 3 of crosswise member 1 are slidably movable with respect to center section 17. In this exemplary embodiment, a fifth actuator 76 is attached at one end to center section 17. A balance arm 78 is pivotally attached to center section 17, and has one end 84 to which actuator 76 pivotally attaches. A first rod 80 is pivotally attached at one extremity to end 84 of balance arm 78, and at the other extremity to right section 2. Similarly, a second rod 82 is attached at one extremity to opposite end 86 of balance arm 78, and at the other extremity to left section 3. As seen in FIG. 10, operation of fifth actuator 76 causes both right and left sections 2 and 3 to slide in synchronous manner, thus opening or closing crosswise member 1. Furthermore, there are provided stabilizers 151 between the supports 100 and the crosswise member 1 allowing for an improved stability with respect to the torsion of the supports 100.

In an alternative of this embodiment, a similar configuration can be formed where a sixth actuator, similar to fifth actuator 76, attaches to end 86 of the balance arm 78. Also, both fifth and sixth actuators may be present. The fifth and sixth actuators may be dual action hydraulic cylinders, or may be manually operated screw jacks.

Figure 11:
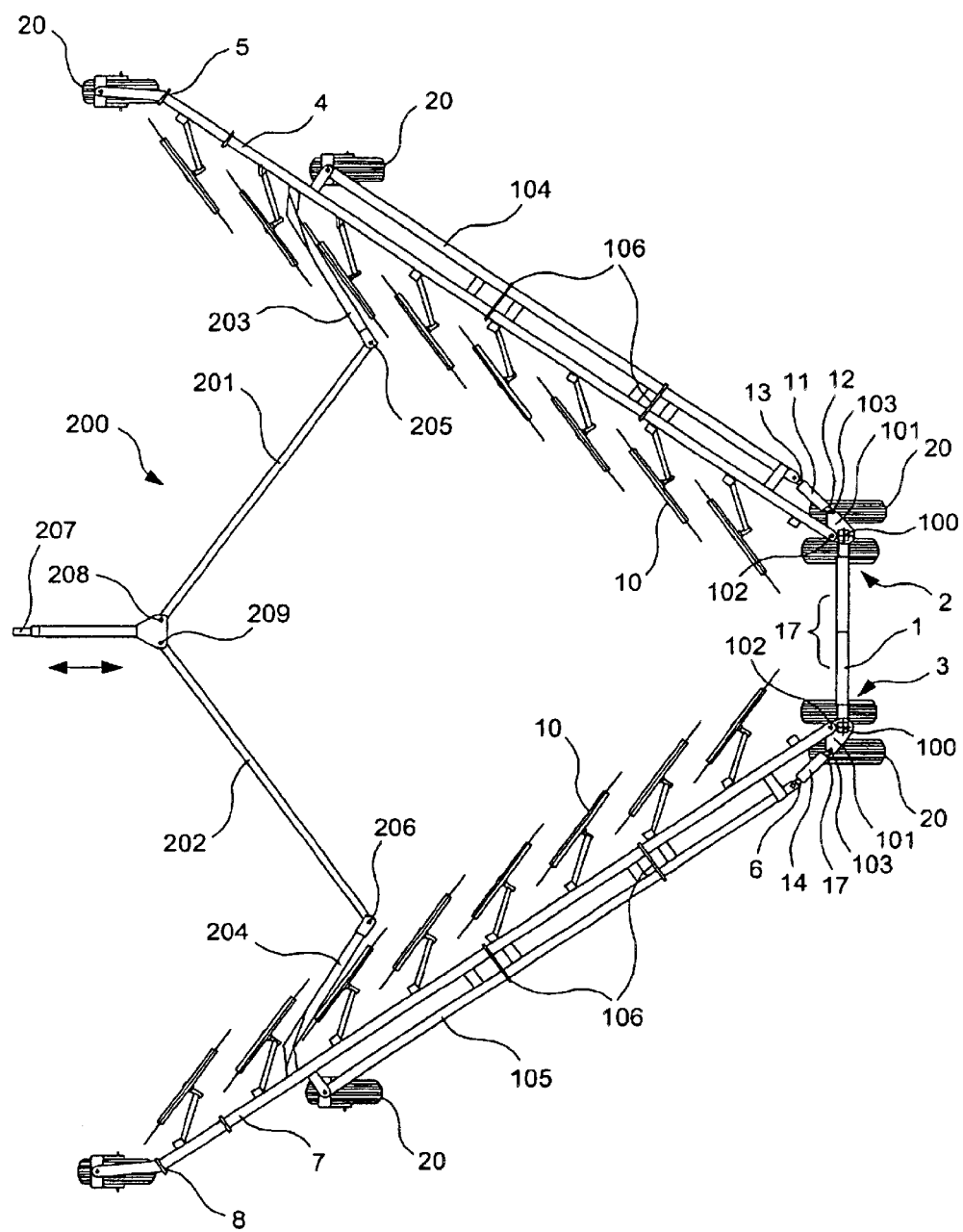
FIG. 11 shows a top plan view of another embodiment of the towable hay rake of the invention.

FIG. 11 shows a further exemplary embodiment of hay rake according to the present invention. FIG. 11 shows a towable hay rake essentially similar to the hay rake shown in FIG. 2 with the exception that there is provided a towing arrangement 200. The towing arrangement 200 includes a first beam 201 and a second beam 202, each having an inner and an outer end. The outer end of each of the first and second beams 201 and 202 is connected to appendages 203 and 204 via joints 205 and 206. The joints 205 and 206 allow a rotational movement of the beams 201 and 202 with respect to the appendages 203 and 204. The appendages 203 and 204 are connected to the first and second rake arms 4 and 7. The inner ends of the beams 201 and 202 are connected to a towing vehicle connector 207. On the front side of the vehicle connector 207, there is provided a suitable connecting means for connecting the hay rake to a vehicle, such as a towing eyelet. On the back side of the vehicle connector, there are provided two joints 208 and 209 connecting the beams 201 and 202 to the vehicle connector 207. When the first and second rake arms 4 and 7 are moved from the open position to the closed position, due to the joints 205, 206, 208 and 209, the towing arrangement is folded into the closing "V" shape of the hay rake. To the contrary, when the first and second rake arms 4 and 7 are opened towards the open position, the towing arrangement is folded out such that a vehicle can be connected to the vehicle connector 207. This embodiment allows for a hay rake, that is very compact in the closed position.

Figure 12:
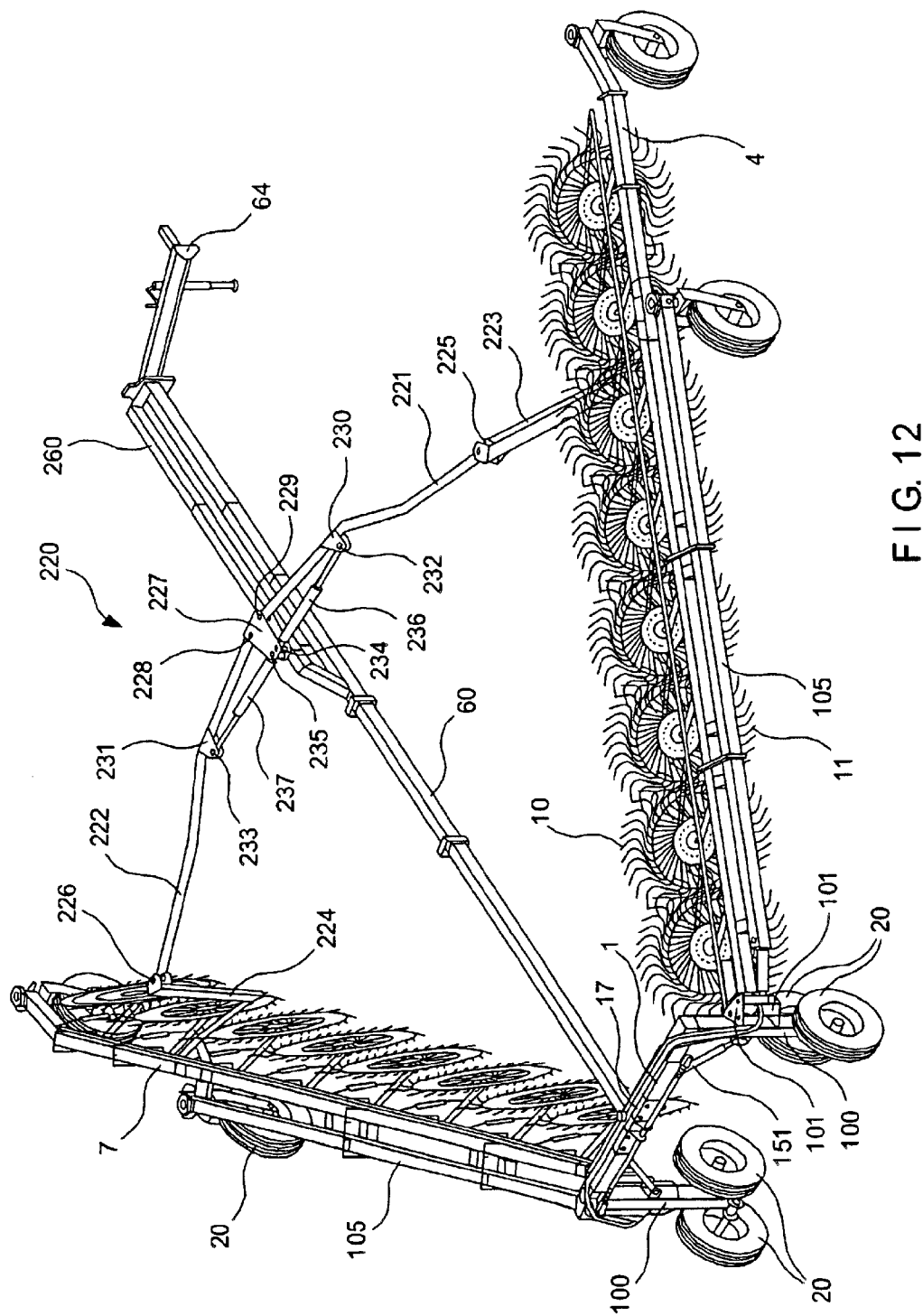
FIG. 12 shows a top perspective view of another embodiment of the towable hay rake of the present invention.

FIG. 12 shows a further exemplary embodiment of hay rake according to the present invention. FIG. 12 shows a towable hay rake essentially similar to the hay rake shown in FIG. 7 with the exception that there is provided a stabilizing arrangement 220. The stabilizing arrangement 220 includes beams 221 and 222 that are connected via appendages 223 and 224 to the first and second rake arms 4 and 7. The connection between the beams 221 and 222 and the appendages 223 and 224 is realized by means of joints 225 and 226 that allow a rotational movement of the beams 221 and 222 about the joints 225 and 226. Inner ends of the beams 221 and 222 are connected to a sliding plate 227 which is resting on a sliding section 260 on the towing arm 60. The beams 221 and 222 are connected to the sliding plate 227 by means of joints 228 and 229 that allow a rotational movement of the beams about the joints 228 and 229. The sliding section 260 is an elevated section of the towing arm 60 which is adapted to support the sliding plate 227. At middle sections 230 and 231 of the beams 221 and 222, there are provided further rotational joints 232 and 233. At a distance from the joints 228 and 229 on the sliding plate 227 in a direction toward the crosswise member 1, there are provided two further rotational joints 234 and 235 on the sliding plate 227. Between the joints 232 and 234 on one side, and between the joints 233 and 235 on the other side, there are provided dampers 236 and 237.

When the rake arms 4 and 7 are moved from the closed position towards the open position, the sliding plate 227 slides on the sliding section 260 of the towing arm 60 towards the crosswise member 1. As a result, the dampers 236 and 237 are expanded. When the rake arms 4 and 7 are moved from the open position towards the closed position, the sliding plate 227 slides on the sliding section 260 of the towing arm 60 in a direction away from the crosswise member 1. As a result, the dampers 236 and 237 are contracted. The dampers 236 and 237 are preferably two way dampers that have a damping action in the expanding direction and the contracting direction. This allows for a stable movement of the first and second rake arms between the open and closed position and for a stable hay rake.

Figure 13:
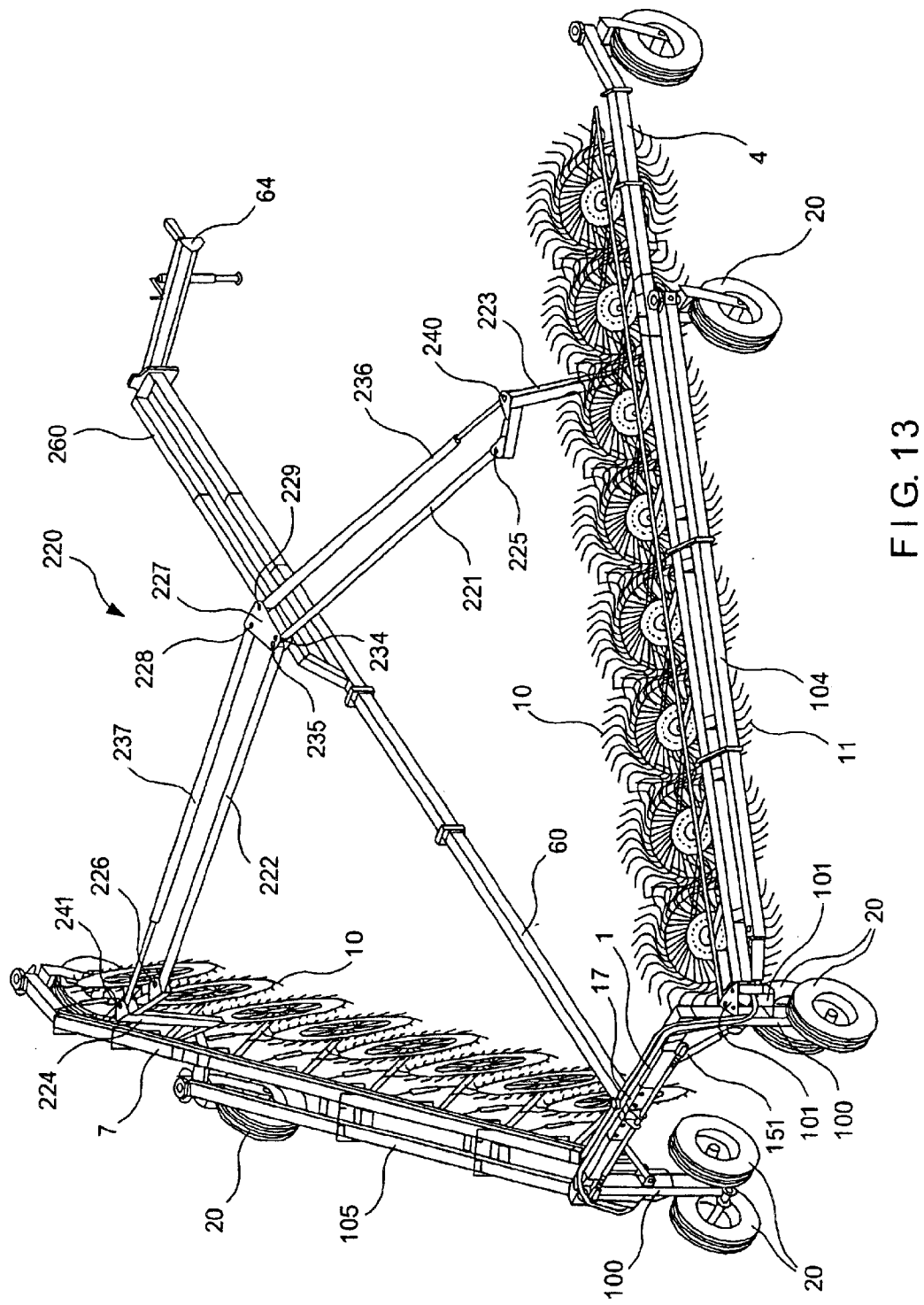
FIG. 13 shows a top perspective view of yet another embodiment of the towable hay rake of the present invention.

FIG. 13 shows a further exemplary embodiment of hay rake according to the present invention. FIG. 13 shows a towable hay rake essentially similar to the hay rake shown in FIG. 12 with the exception that the beams 221 and 222 are connected to the joints 234 and 235 of the sliding plate 227 on the side of the sliding plate 227 facing the crosswise member 1. Furthermore, the damper 236 is connected to and between joint 229 of the sliding plate 227 and a joint 240 at the appendage 223 and the damper 237 is connected to and between joint 228 of the sliding plate 227 and a joint 241 at the appendage 224. This arrangement provides for a very stable hay rake.

Figure 14:
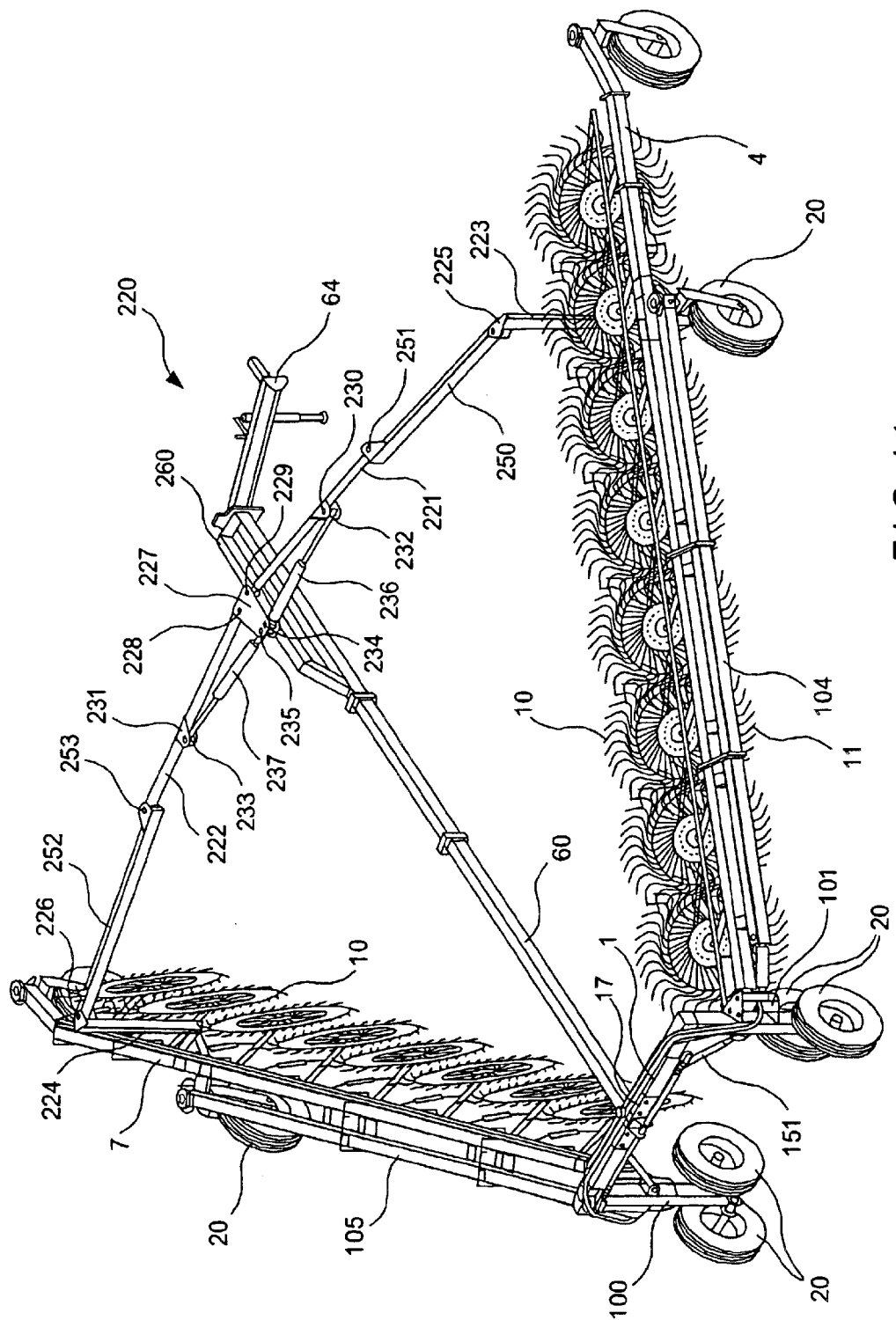
FIG. 14 shows a top perspective view of yet another embodiment of the towable hay rake of the present invention.

FIG. 14 shows a further exemplary embodiment of hay rake according to the present invention. FIG. 14 shows a towable hay rake essentially similar to the hay rake shown in FIG. 12 with the exception that the beams 221 and 222 are not connected directly to appendages 223 and 224 by means of joints 225 and 226. In FIG. 14, beam 221 is connected to one end of a further beam 250 by means of a rotational joint 251. Another end of the further beam 250 is connected to appendage 223 by the joint 225. Furthermore, in FIG. 14, beam 222 is connected to one end of a further beam 252 by means of a rotational joint 253. Another end of the further beam 252 is connected to appendage 224 by the joint 226.

Figure 15:
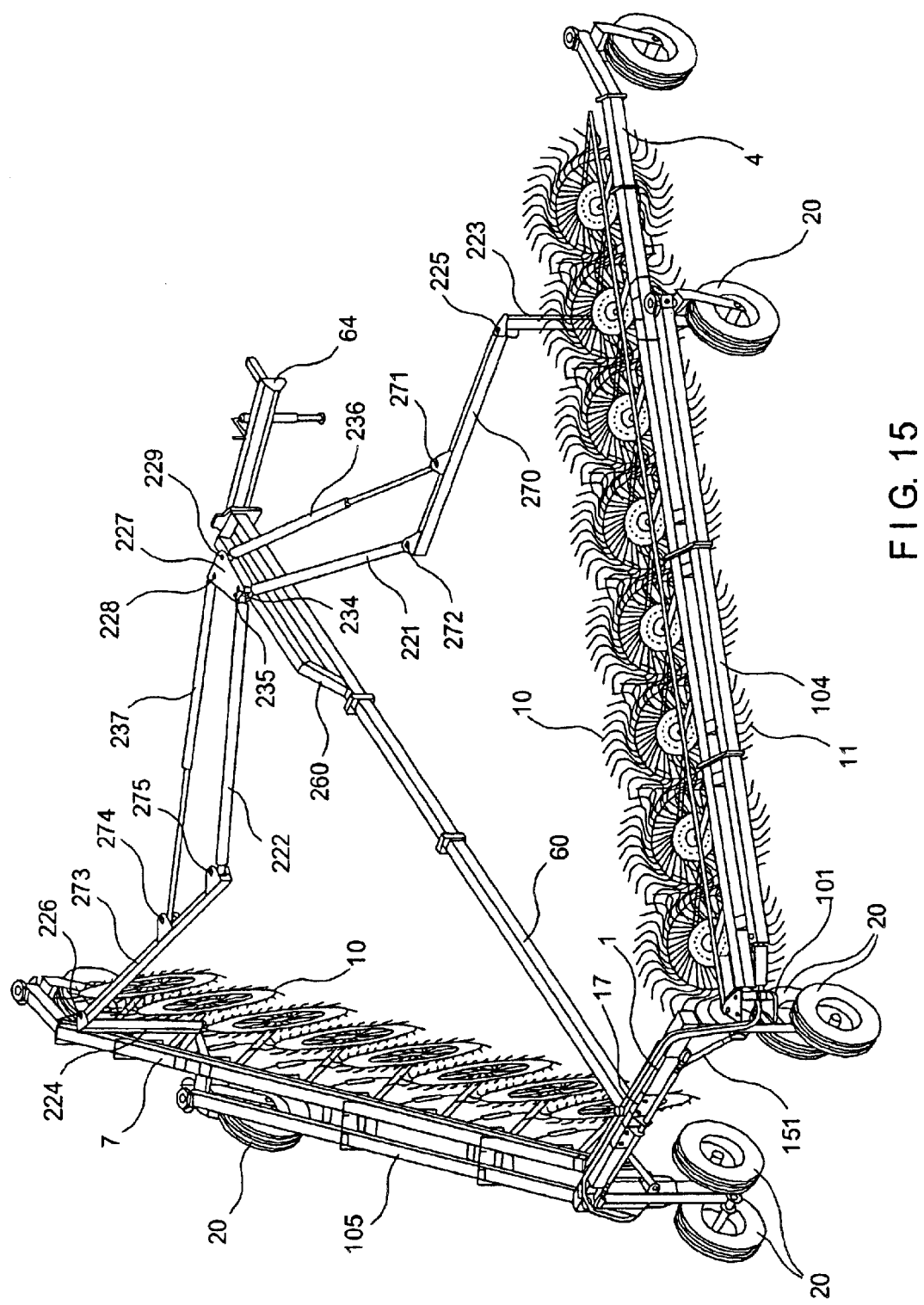
FIG. 15 shows a perspective view of yet another embodiment of the towable hay rake of the present invention.

FIG. 15 shows a further exemplary embodiment of the hay rake according to the present invention. FIG. 15 shows a towable hay rake essentially similar to the hay rake shown in FIG. 13 except that between the appendages 223 and 224, there are provided further beams 270 and 273. In detail, the damper 236 and the beam 221 are connected to the further beam 270 by means of rotational joints 271 and 272, respectively. The further beam 270 is connected to the appendage 223 via joint 225. Furthermore, the damper 237 and the beam 222 are connected to the further beam 273 by means of rotational joints 274 and 275, respectively. The further beam 273 is connected to the appendage 224 via joint 226.

Figure 16A:
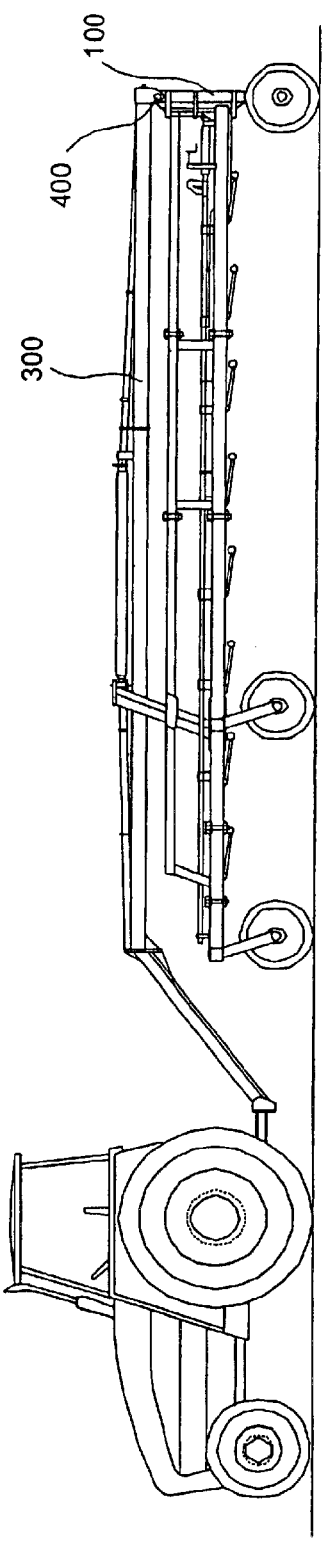
Figure 16B:
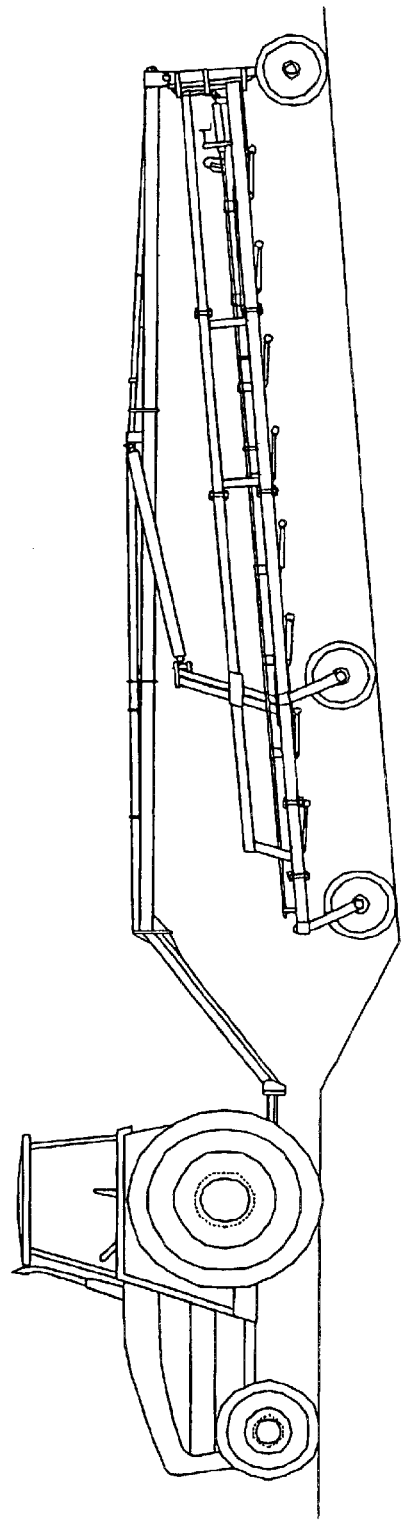

FIGS. 16A to 16C illustrate a hay rake in accordance with still another embodiment of the present invention. According to this embodiment, the hay rake is provided with a flexibility system that reduces the stress on the various components of the hay rake when the hay rake is operated on uneven terrain. For instance, FIG. 16A is a side view that illustrates the hay rake being pulled, on even terrain, by a tractor via the towbar 300. As shown in the figure, the hay rake further includes a rotatable connection 400 at the location where the hay rake arm, e.g., hay rake arm 4, connects to the crosswise member 1. On even terrain, the rotatable connection 400 enables the hay rake arm 4 to be connected to the crosswise member 1 such that the support 100 is substantially perpendicular to the towbar 300. FIG. 16C illustrates a first rotatable connection 400*a* rotatably connecting the crosswise member 1 to support 100*a* which supports hay rake arm 7, and a second rotatable connection 400*b* rotatably connecting the crosswise member 1 to support 100*b* which supports the hay rake arm 4. FIG. 16B is another side view that illustrates the hay rake being pulled by a tractor via the towbar 300, but in this figure, the hay rake is being pulled over uneven terrain. As shown in FIG. 16B, when the hay rake is pulled over uneven terrain, the rotatable connection 400 enables the supports 100 to rotate relative to the crosswise member 1. Thus, the support 100 is not maintained in a substantially perpendicular position relative to the towbar 300, but instead the hay rake arm 4 is permitted to be raised or lowered in accordance with the terrain. Because, in the embodiment shown in FIGS. 16A to 16C, each support 100*a* and 100*b* is rotatably mounted to the crosswise member 1 by respective rotatable connections 400*a* and 400*b*, the hay rake arms 4 and 7 are independently raised or lowered depending on the terrain. For instance, the rotatable connection 400*a* may enable the hay rake arm 7 to be lowered while simultaneously the rotatable connection 400*b* may enable the hay rake arm 4 to be raised, or vice versa.

In order to enable the hay rake to be steered more easily, the hay rake may be equipped with an automatic steering mechanism. Several embodiments of automatic steering mechanisms are illustrated in FIGS. 17 to 20(*b*), each of which is described in greater detail below. It should be noted that, while the embodiments illustrated in FIGS. 17 to 20(*b*) each show and describe that the automatic steering mechanism is coupled to a set of rear wheels of the hay rake, the automatic steering mechanism may be configured to steer wheels in any other position on the hay rake. It should also be noted that, while the embodiments illustrated in FIGS. 17 to 20(*b*) each show and describe that the automatic steering mechanism is coupled to a set of wheels of a particular type of collapsible pull-type V-shaped hay rake, the automatic steering mechanism may be configured to steer wheels on any type of towable hay rake, including, for example those described in U.S. Pat. Nos. 5,685,135 and 6,000,207.

Figure 17:
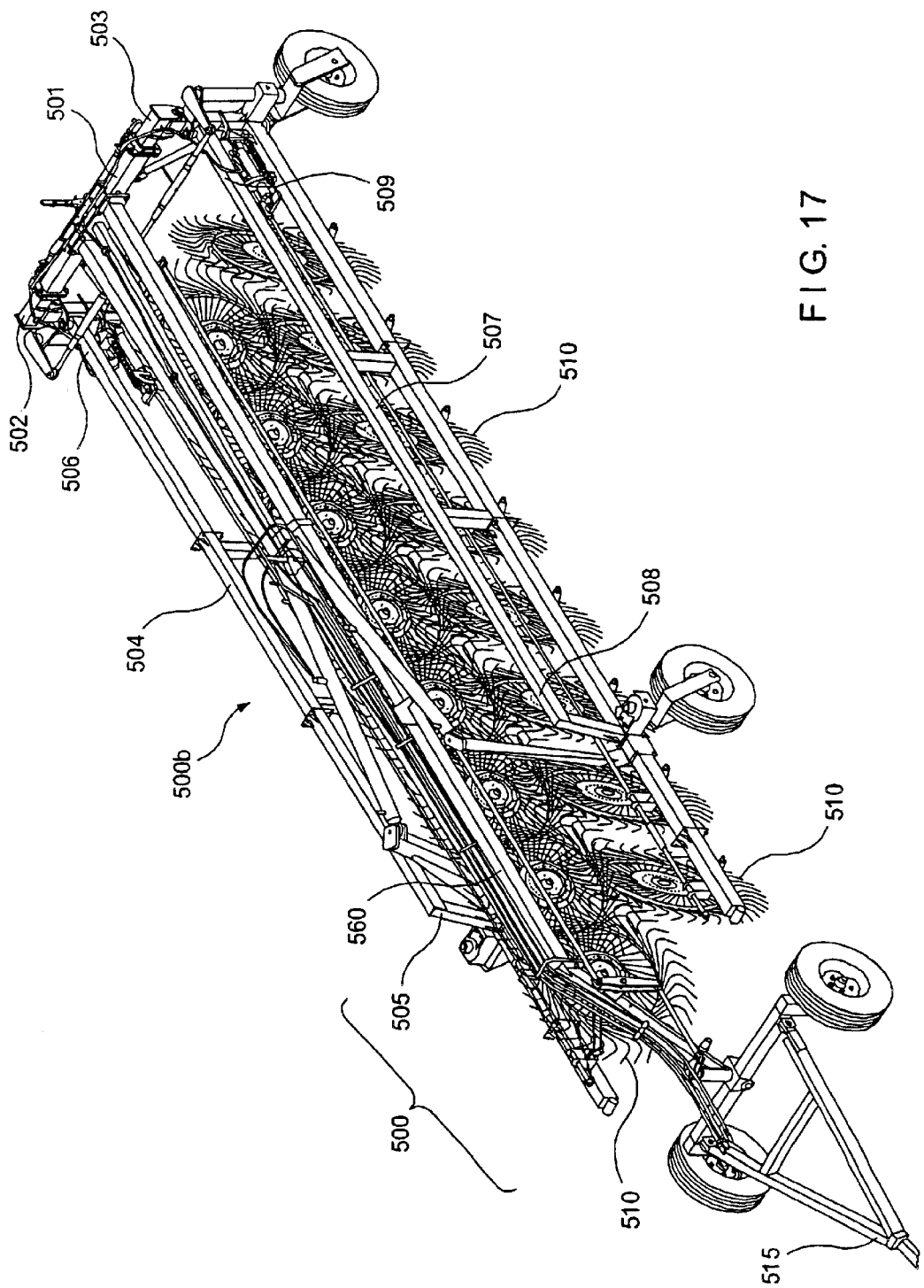
FIG. 17 shows a perspective view of a towable hay rake having an automatic steering mechanism, according to one embodiment of the present invention.

Referring now to FIG. 17, there is illustrated a hay rake 500 with an automatic steering mechanism for steering at least one wheel of the hay rake 500. According to one embodiment of the present invention, the hay rake 500 has a first carriage portion 500*a* and a second carriage portion 500*b*. The first carriage portion 500*a* has a connection mechanism 515, e.g., an eyelet, for connecting to a tractor or the like for pulling the hay rake 500. The first carriage portion 500*a* is connected to the second carriage portion 500*b* by a longitudinal towing arm 560 that extends to the rear of the second carriage portion 500*b* and is coupled to a cross member 501. The cross member 501 has a right section 502 and a left section 503. A first rake arm 504 having a front end 505 and a back end 506 is pivotably mounted at its back end 506 to the right section 502 of the crosswise member 501 so as to be moveable between an open position and a closed position. The position depicted in FIG. 17 is a closed position. A second rake arm 507 having a front end 508 and a back end 509 is pivotably mounted at its back end 509 to the left section 503 of the cross member 501 so as to be moveable between an open position and a closed position. As with the first rake arm 504, the second rake arm 507 is depicted in FIG. 17 in a closed position. A plurality of rotatable haymaker wheels 510 are mounted to each of the first and second rake arms 504 and 507. Advantageously, the first and second rake arms 504 and 507 move from the closed position depicted in FIG. 17, in which the hay rake 500 is easy to transport and store, to an open position, in which the hay rake is configured to rake a large area.

FIGS. 18(*a*) to 18(*e*) provide additional views of the automatic steering mechanism illustrated in FIG. 17. For instance, FIG. 18(*a*) illustrates several features of an automatic steering mechanism 570 in the vicinity of the first carriage portion 500*a*. Specifically, there is shown in FIG. 18(*a*) the connection of the longitudinal towing arm 560 to the first carriage portion 500*a*, as well as several features of the automatic steering mechanism 570. A first part 560*a* of the longitudinal towing arm 560 includes a cylindrical sleeve 563 having a vertically disposed central axis 564. Extending through the cylindrical sleeve 563 is a pin 565 that is configured to rotate within the cylindrical sleeve 563 around the vertically disposed central axis 564. A bottom end of the pin 565 is attached to a bracket 561 that is mounted to a cross member 562 of the first carriage portion 500*a*. FIG. 18(*a*) illustrates one way to mount the bracket 561 to the cross member 562 of the first carriage portion 500*a*, while FIG. 18(*e*) illustrates still another way to mount the bracket 561 to the cross member 562 of the first carriage portion 500*a*. A top end of the pin 565 is fixedly attached to a first end of an arm 566. A second end of the arm 566 is rotatably attached, around a vertically disposed axis of rotation 567, to a first end of a first extension rod 571. A second end of the first extension rod 571 is rotatably coupled to a first end of an arm 572. The arm 572 is rotatably coupled, at a center region of the arm 572, to a pin 573 extending horizontally from the longitudinal towing arm 560. A second end of the arm 572 is rotatably coupled to a first end of a second extension rod 574. As shown in FIGS. 18(*a*) and 18(*b*), the second extension rod 574 extends towards the rear end of the second carriage portion 500*b* through eyelets 5741.

FIG. 18(*d*) illustrates additional features of the steering mechanism 570. Specifically, FIG. 18(*d*) illustrates a bottom view of the rear end of the second carriage 500*b*. The second extension rod 574 is rotatably coupled to one arm 575*a* of a V-shaped bracket 575. The center of the V-shaped bracket 575 has an orifice 576 through which extends a vertically disposed pin 577 mounted to the longitudinal towing arm 560. Thus, the V-shaped bracket 575 is configured to rotate around the pin 577. A second arm 575*b* of the V-shaped bracket 575 is coupled to a cross-member 578. The cross-member 578 is rotatably coupled at a first end 578*a* to a first arm 579*a*. In addition, the cross-member 578 is rotatably coupled at a second end 578*b* to a second arm 579*b*.

Figure 18A:
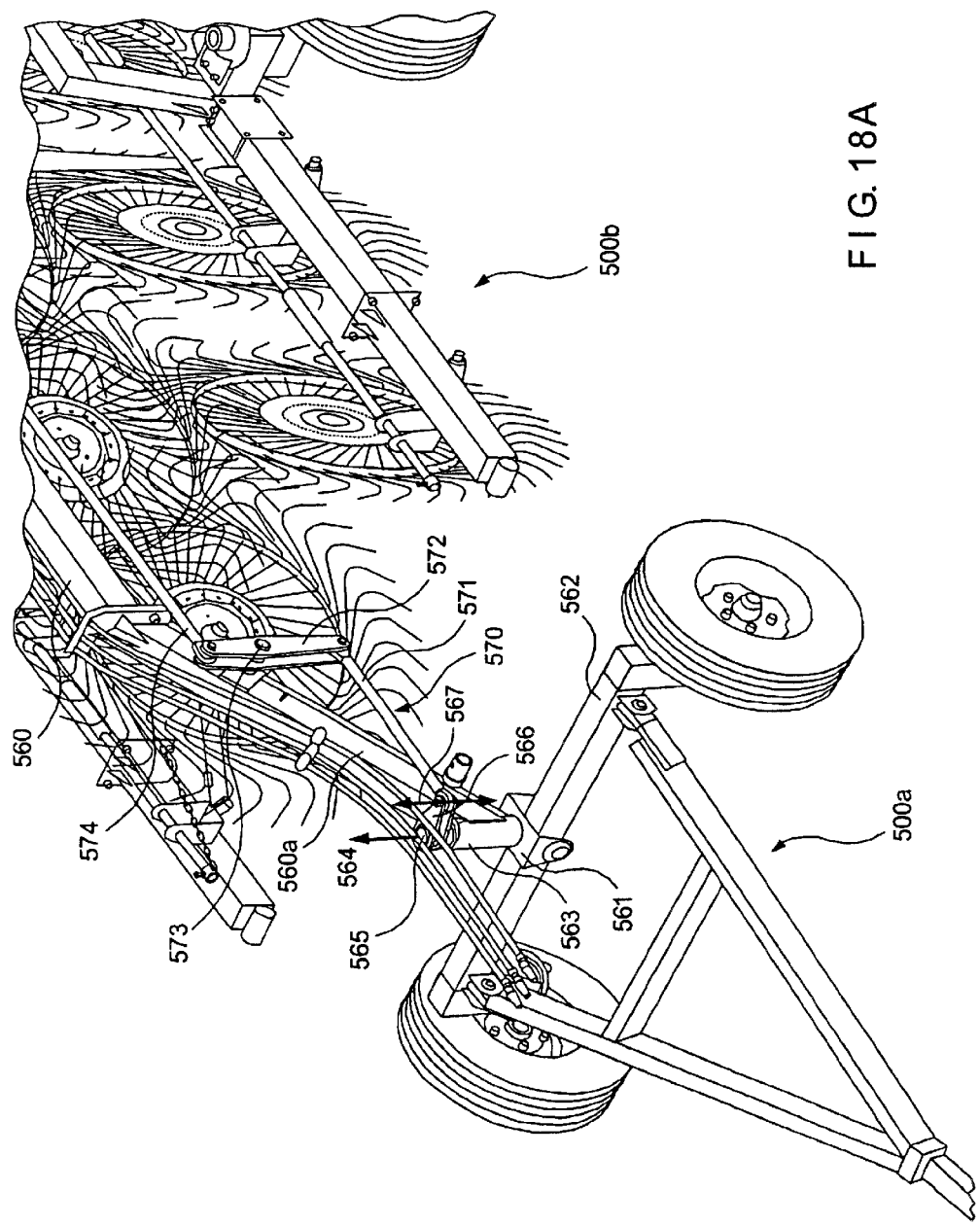
FIG. 18(a) shows an enlarged perspective view of a front portion of the towable hay rake having an automatic steering mechanism, according to the embodiment of the present invention shown in FIG. 17.
Figure 18B:
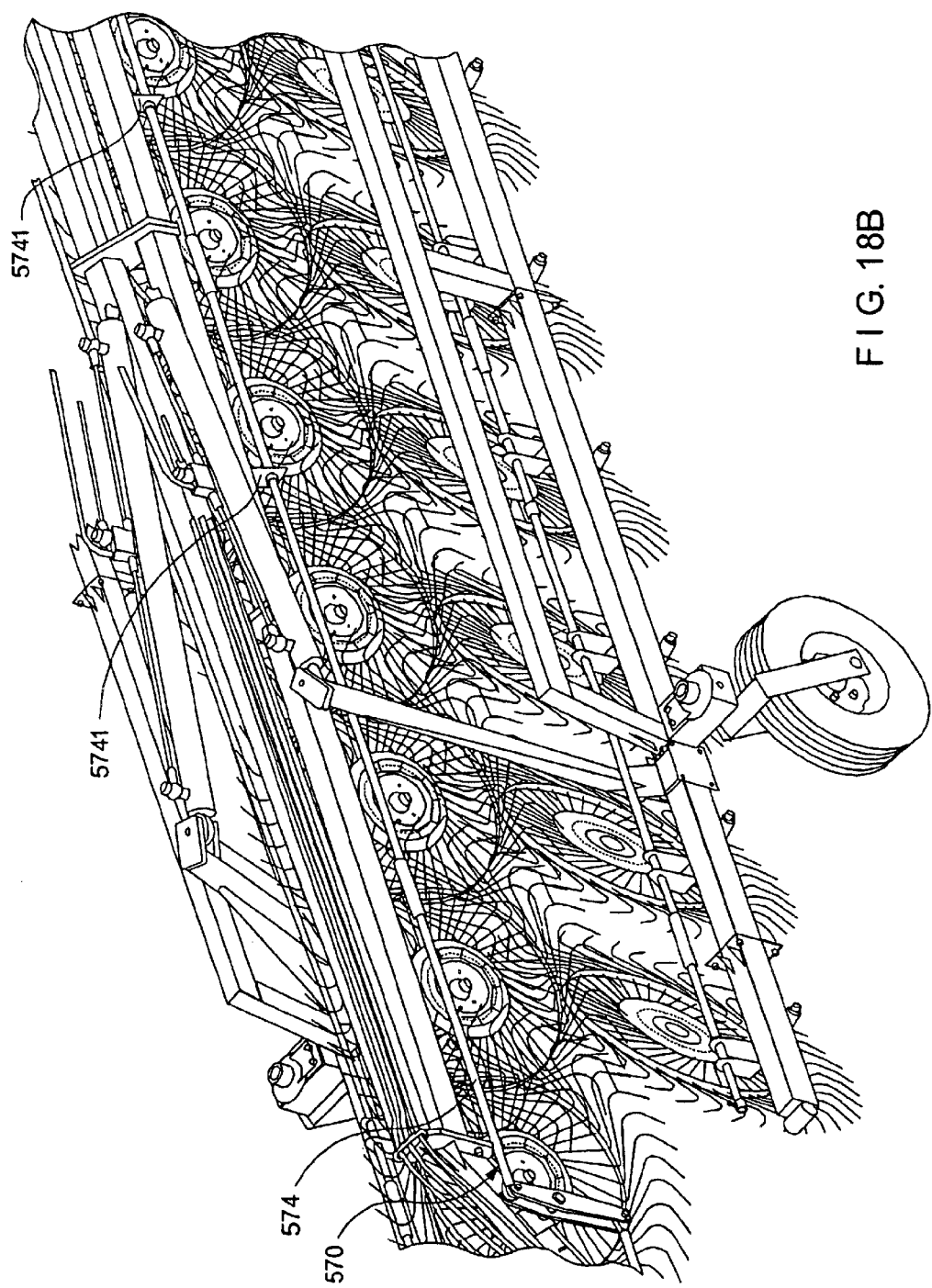
FIG. 18(b) shows an enlarged perspective view of a middle portion of the towable hay rake having an automatic steering mechanism, according to the embodiment of the present invention shown in FIG. 17.
Figure 18C:
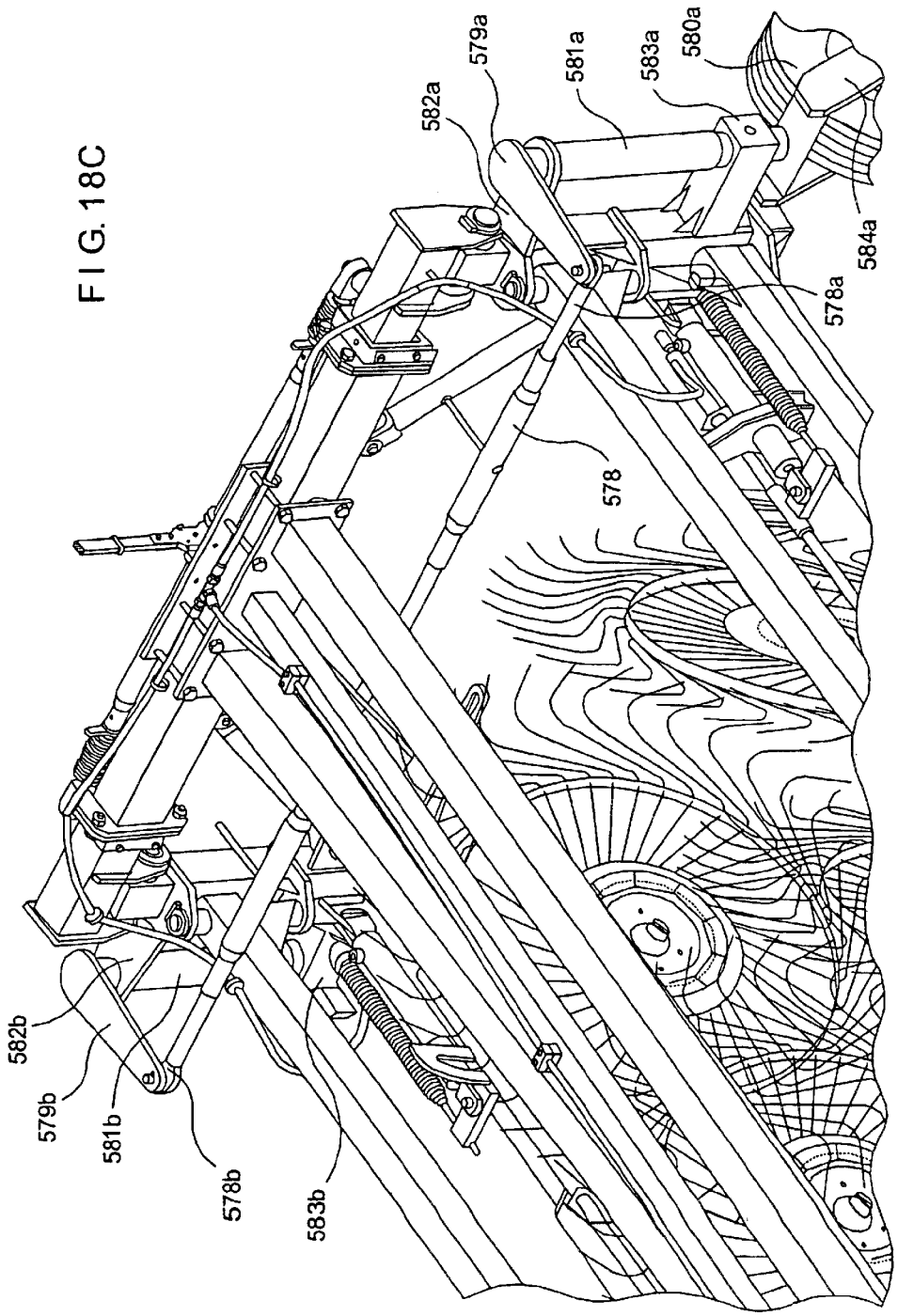
FIG. 18(c) shows an enlarged perspective view of a rear portion of the towable hay rake having an automatic steering mechanism, according to the embodiment of the present invention shown in FIG. 17.
Figure 18D:
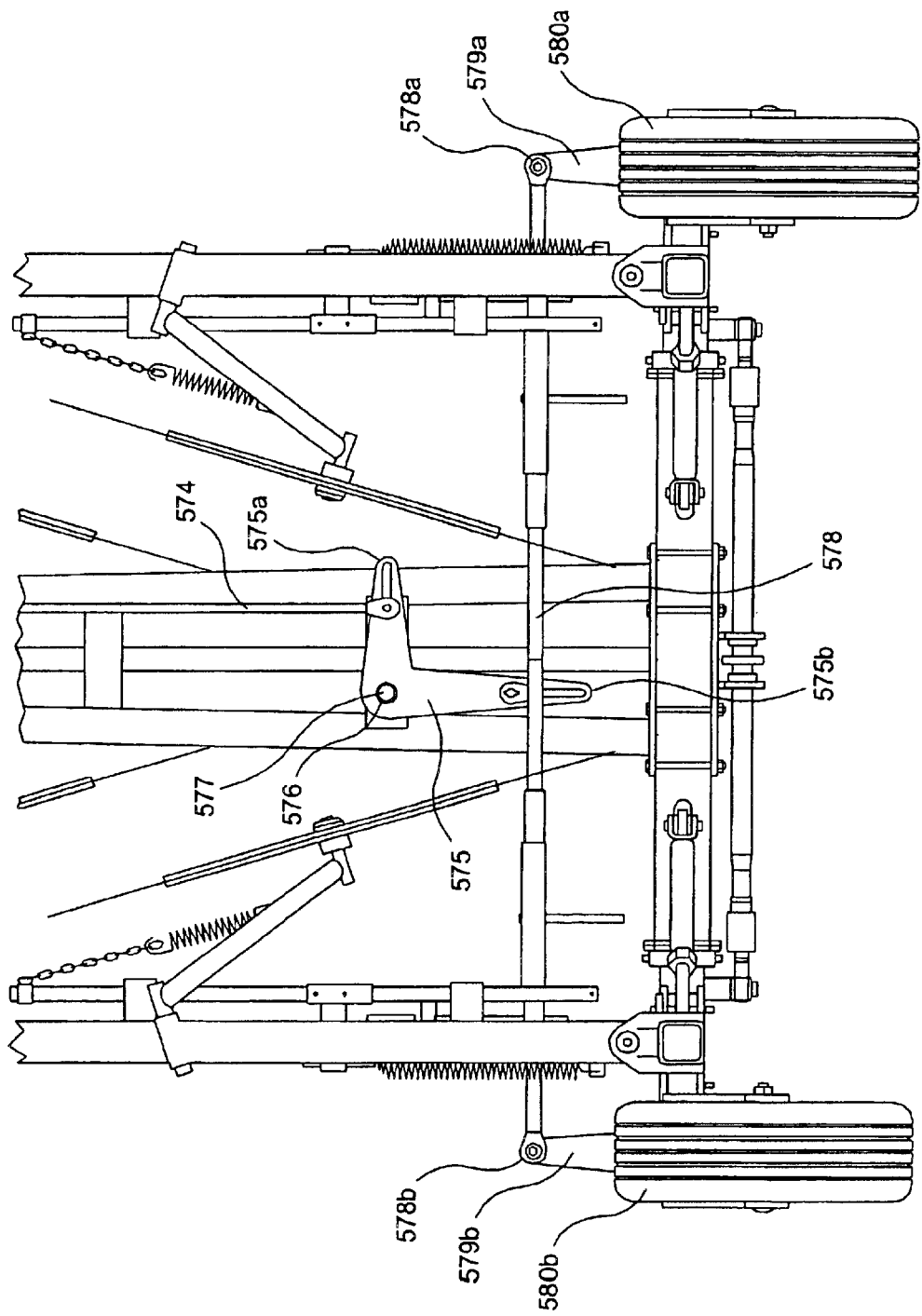
FIG. 18(d) shows bottom view of the middle portion of the towable hay rake having an automatic steering mechanism, according to the embodiment of the present invention shown in FIG. 17.
Figure 18E:
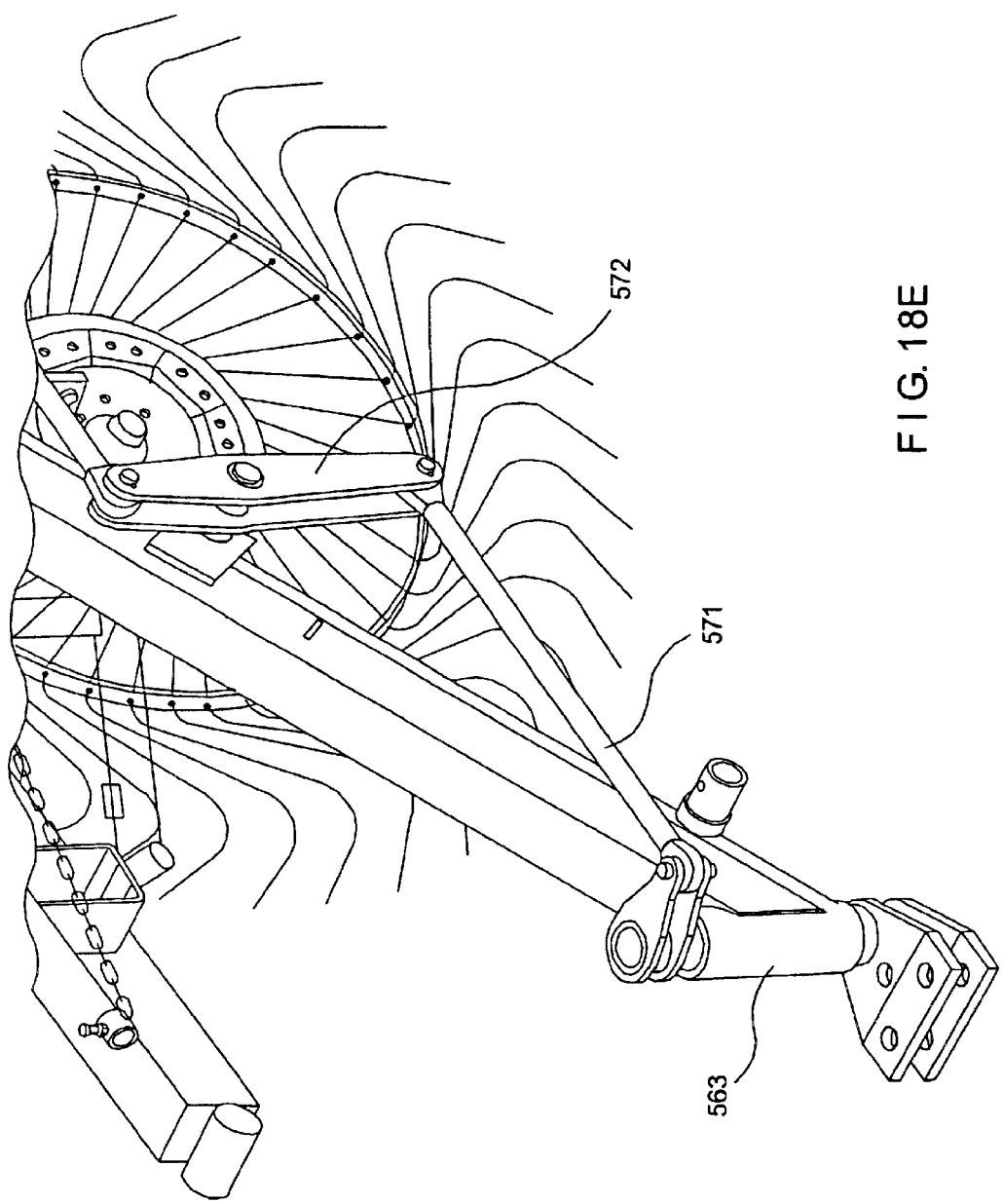
FIG. 18(e) shows an enlarged perspective view of a front portion of the towable hay rake having an automatic steering mechanism, according to an alternative embodiment of the present invention.

FIG. 18(c) is a perspective view of the rear end of the second carriage portion 500b that shows in greater detail the connection of the cross-member 578 to the wheels of the hay rake 500. Specifically, FIG. 18(c) illustrates the first end 578a of the cross-member 578 rotatably coupled to a first end of the first arm 579a. The second end of the first arm 579a is coupled to a first pin 581a that extends through and rotates within support brackets 582a and 583a mounted to the rear end of the second carriage portion 500b. The first pin 581a is fixedly connected to a first wheel hub 584a that carries a first wheel 580a. In addition, FIG. 18(c) illustrates the second end 578b of the cross-member 578 rotatably coupled to a first end of the second arm 579b. The second end of the second arm 579b is coupled to a second pin 581b that extends through and rotates within support brackets 582b and 583b mounted to the rear end of the second carriage portion 500b. The second pin 581b is fixedly connected to a second wheel hub 584b (hidden from view in FIG. 18(c)) that carries a second wheel 580b (hidden from view in FIG. 18(c), but shown in FIG. 18(d)).

In operation, the automatic steering mechanism 570 enables the wheels of the hay rake 500 to be automatically synchronized with a change in the towing direction of the hay rake 500. For instance, according to the embodiment shown, a change in the towing direction causes the first carriage portion 500a, which is initially aligned with the second carriage portion 500b, to be angled relative to the second carriage portion 500b. The relative movement of the first carriage portion 500a causes the cross member 562 to rotate, and thus the vertically-disposed pin 565 extending upwards from the cross member 562 to rotate within the cylindrical sleeve 563. If the change in the towing direction is towards the left, then the pin 565 rotates in a counter-clockwise direction (when viewed from the top) within the cylindrical sleeve 563. If the change in the towing direction is towards the right, then the pin 565 rotates in a clockwise direction (when viewed from the top) within the cylindrical sleeve 563. Rotation of the pin 565 causes rotational movement of the arm 566 that is fixedly attached to the top end of the pin 565, which in turn causes longitudinal movement of the first extension rod 571 that is coupled to the arm 566. Specifically, rotation of the pin 565 in the counter-clockwise direction causes the arm 566 to move the first extension rod 571 in a rearward, longitudinal direction, while rotation of the pin 565 in the clockwise direction causes the arm 566 to move the first extension rod 571 in a forward longitudinal direction.

Movement of the first extension rod 571 causes the arm 572 to rotate around the pin 573 extending horizontally from the longitudinal towing arm 560, which in turn causes longitudinal movement of the second extension rod 574. Specifically, when the first extension rod 571 is moved in a rearward, longitudinal direction, the arm 572 is caused to rotate in a counter-clockwise direction around the pin 573 (in the view shown in FIG. 18(a)), which in turn causes the second extension rod 574 to move in a forward, longitudinal direction. Similarly, when the first extension rod 571 is moved in a forward, longitudinal direction, the arm 572 is caused to rotate in a clockwise direction around the pin 573, which in turn causes the second extension rod 574 to move in a rearward, longitudinal direction.

Longitudinal movement of the second extension rod 574 causes the V-shaped bracket 575 to rotate around the pin 577. Specifically, when the second extension rod 574 is moved in a rearward, longitudinal direction, the first arm 575a of the V-shaped bracket 575 moves in a rearward direction, which in turn causes the second arm 575b of the V-shaped bracket 575 to move towards the left (in the view shown in FIG. 18(d)). When the second extension rod 574 is instead moved in a forward, longitudinal direction, the first arm 575a of the V-shaped bracket 575 moves in a forward direction, which in turn causes the second arm 575b of the V-shaped bracket 575 to move towards the right (in the view shown in FIG. 18(d)). The movement of the second arm 575b of the V-shaped bracket 575 causes the cross-member 578 to move in a direction which is perpendicular to the longitudinal towing arm 560. When the cross-member 578 moves to the right (in the view shown in FIG. 18(d)), the first ends of the first arm 579a and the second arm 579b are in turn moved towards the right. The pins 581a and 581b that are attached to the second ends of the first arm 579a and the second arm 579b, respectively, are thereby caused to rotate in a clockwise direction (when-viewed from the top). The rotation of the pins 581a and 581b in the clockwise direction causes both of the wheels 580a and 580b, which are coupled to the pins 581a and 581b via the first wheel hub 584a and the second wheel hub 584b, respectively, to be turned towards the right. Thus, a change in the towing direction of the hay rake 500 towards the right causes actuation of the steering mechanism 570, which turns the wheels 580a and 580b towards the right. Likewise, when the cross-member 578 moves to the left (in the view shown in FIG. 18(d)), the first ends of the first arm 579a and the second arm 579b are in turn moved towards the left. The pins 581a and 581b that are attached to the second ends of the first arm 579a and the second arm 579b, respectively, are thereby caused to rotate in a counter-clockwise direction (when viewed from the top). The rotation of the pins 581a and 581b in the counter-clockwise direction causes both of the wheels 580a and 580b to be turned towards the left. Thus, a change in the towing direction of the hay rake 500 towards the left causes actuation of the steering mechanism 570, which turns the wheels 580a and 580b towards the left. Therefore, the automatic steering mechanism 570 automatically steers the wheels of the hay rake 500 to correspond to a change in the towing direction of the hay rake 500.

Of course, it should be understood that, while the embodiments of the automatic steering mechanism are shown herein as including first and second carriage portions, the present invention also contemplates the use of a single such carriage portion, e.g., whereby the front end of the longitudinal towing bar connects directly to a tractor or the like for pulling the hay rake, so long as a change in the towing direction causes movement of the automatic steering mechanism, which in turn causes a change in the direction of travel of wheels of the hay rake. It is also understood that the automatic steering mechanism described herein is merely one way in which a change in towing direction may eventually cause a change in the direction of travel of wheels of the hay rake, and that various other types of mechanical elements within the purview of the present invention may be employed for this purpose.

Figure 19A:
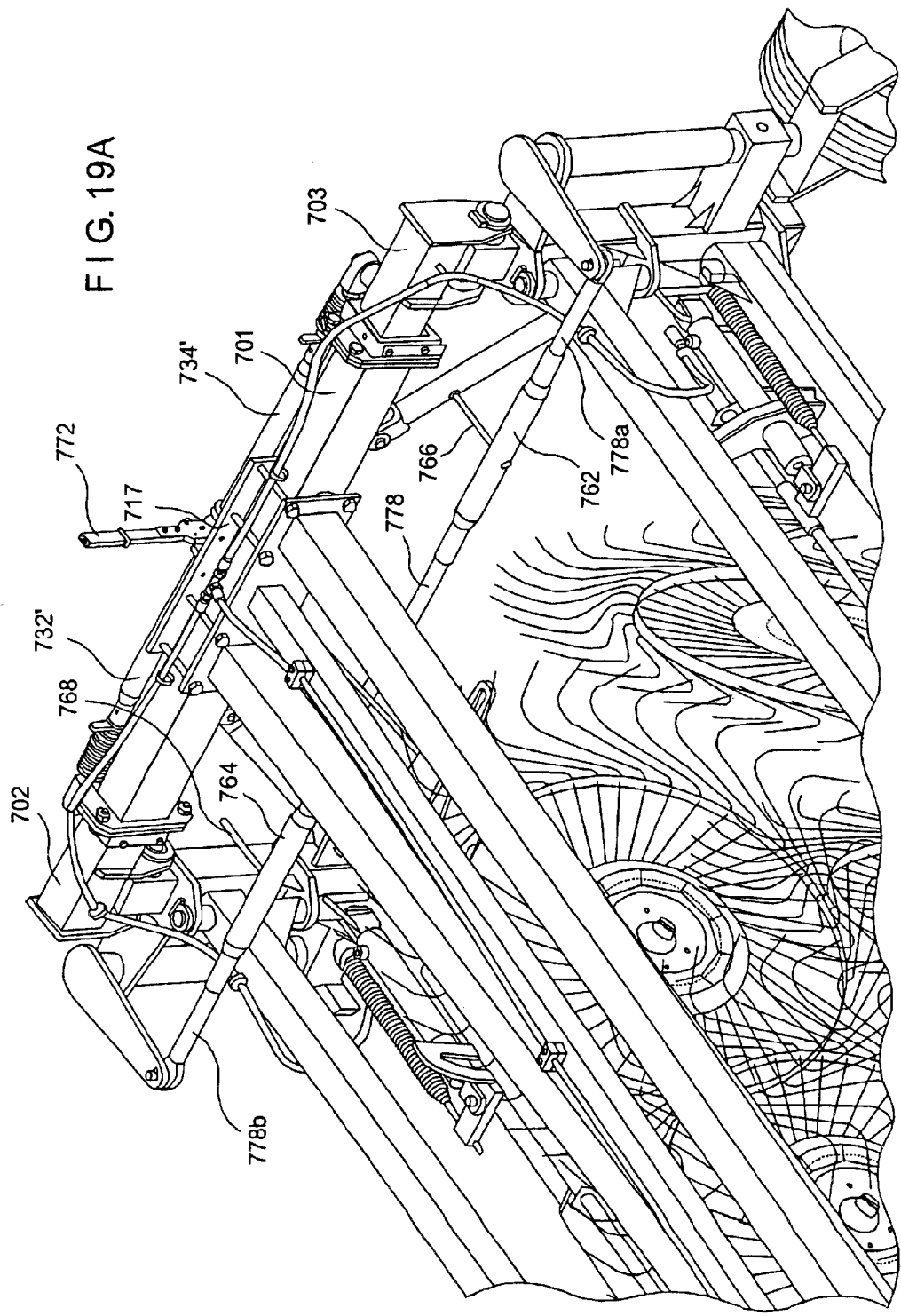
FIG. 19(a) shows a perspective view of a rear portion of the towable hay rake having a manually-adjustable automatic steering mechanism, according to one embodiment of the present invention.
Figure 19B:
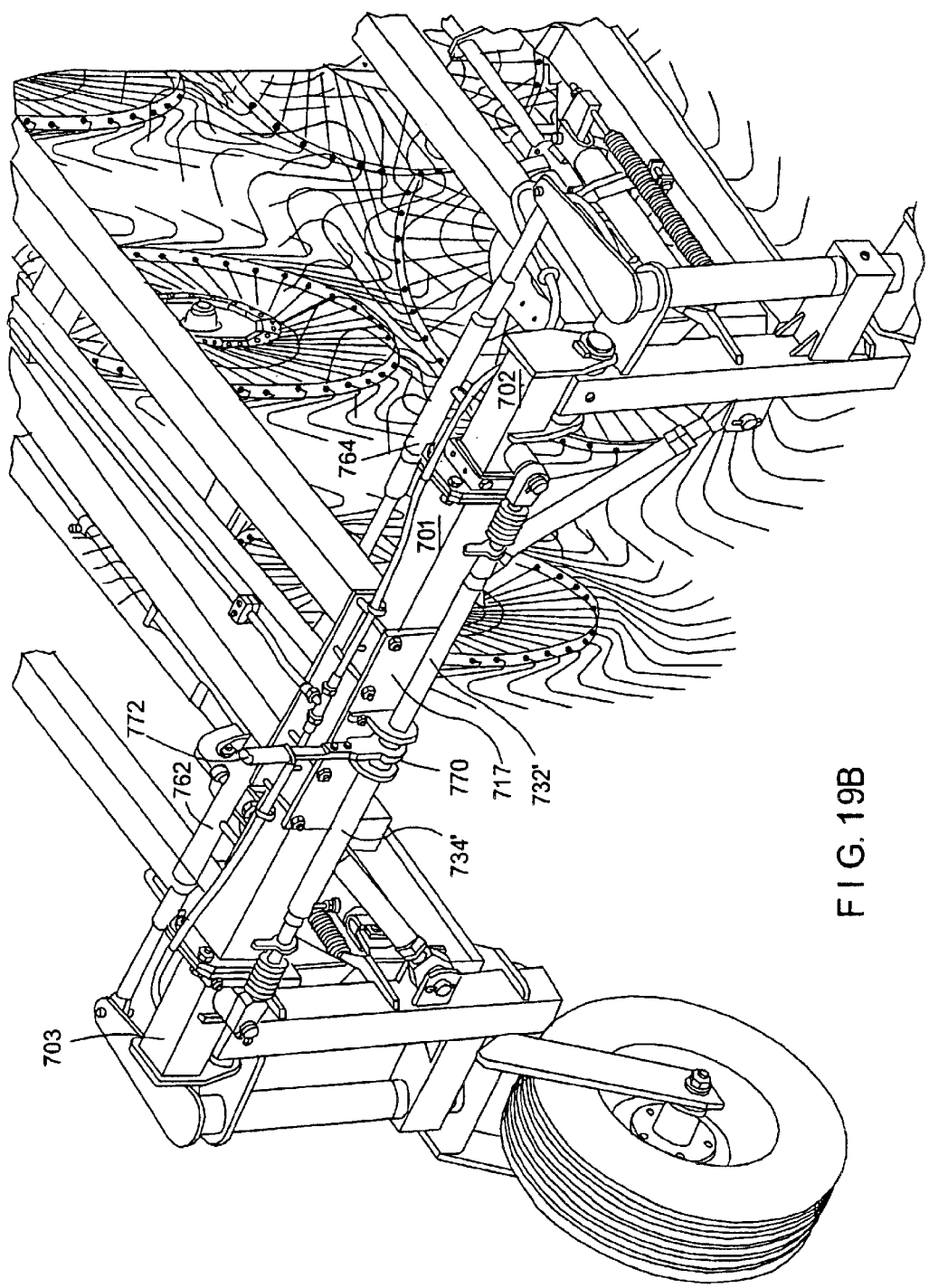
FIG. 19(b) shows a rear perspective view of the rear portion of the towable hay rake having a manually-adjustable automatic steering mechanism, according to the embodiment of the present invention shown in FIG. 19(a)

FIGS. 19(a) and 19(b) illustrate an automatic steering mechanism in accordance with another embodiment of the present invention. Specifically, FIGS. 19(a) and 19(b) illustrate one arrangement by which a steering mechanism may be employed with a hay rake having manually-operated, telescoping right and left sections of the cross member, as previously described in connection with FIG. 9. For instance, FIGS. 19(a) and 19(b) illustrate right section 702 and left section 703 of the cross member 701 that can telescope in and out of the center section 717 of cross member 701. Dual action actuators 732 and 734 respectively operate the right section 702 and the left section 703, so as to extend and retract them. In the embodiment shown in FIGS. 19(*a*) and 19(*b*), the actuators 732 and 734 are manually-operated, dual action screw jacks connected to center section 717 at one end, and respectively to right and left sections 702 and 703 on the other end. In the embodiment shown, both the actuators 732 and 734 are actuated by a ratchet mechanism 770 attached to center section 717, which is manually operated by the operator using lever 772. In addition, FIGS. 19(*a*) and 19(*b*) illustrate dual action actuators 762 and 764 on sections 778*a* and 778*b*, respectively, of the cross member 778. Preferably, these dual action actuators 762 and 764 are also manually-operated, dual action screw jacks. In the embodiment shown, the actuators 762 and 764 are manually operated by a user with handles 766 and 768, respectively. In an alternative embodiment (not shown), the actuators 762 and 764 are actuated by the ratchet mechanism 770 attached to the center section 717, such that actuation of the actuators 732 and 734 to extend or retract the right and left sections 702, 703, automatically and simultaneously actuates the actuators 762 and 764 to extend and retract sections 778*a* and 778*b* of the cross member 778. According to still another embodiment, separate ratchet mechanisms are employed, e.g., a first ratchet mechanism to simultaneously operate the actuators 734 and 762, and a second ratchet mechanism to simultaneously operate the actuators 732 and 764.

Figure 20A:
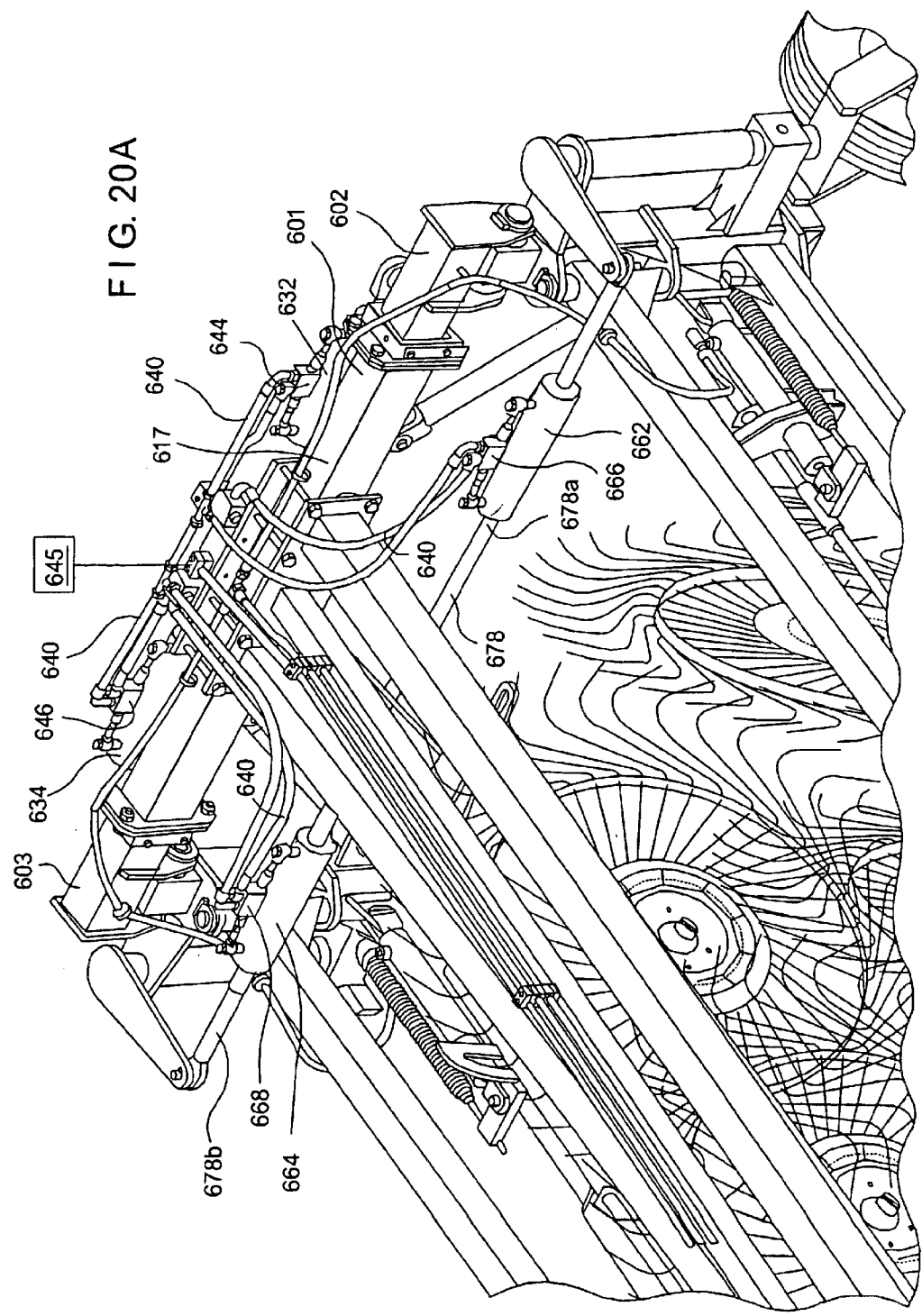
FIG. 20(a) shows a perspective view of a rear portion of the towable hay rake having a hydraulically-adjustable automatic steering mechanism, according to one embodiment of the present invention.
Figure 20B:
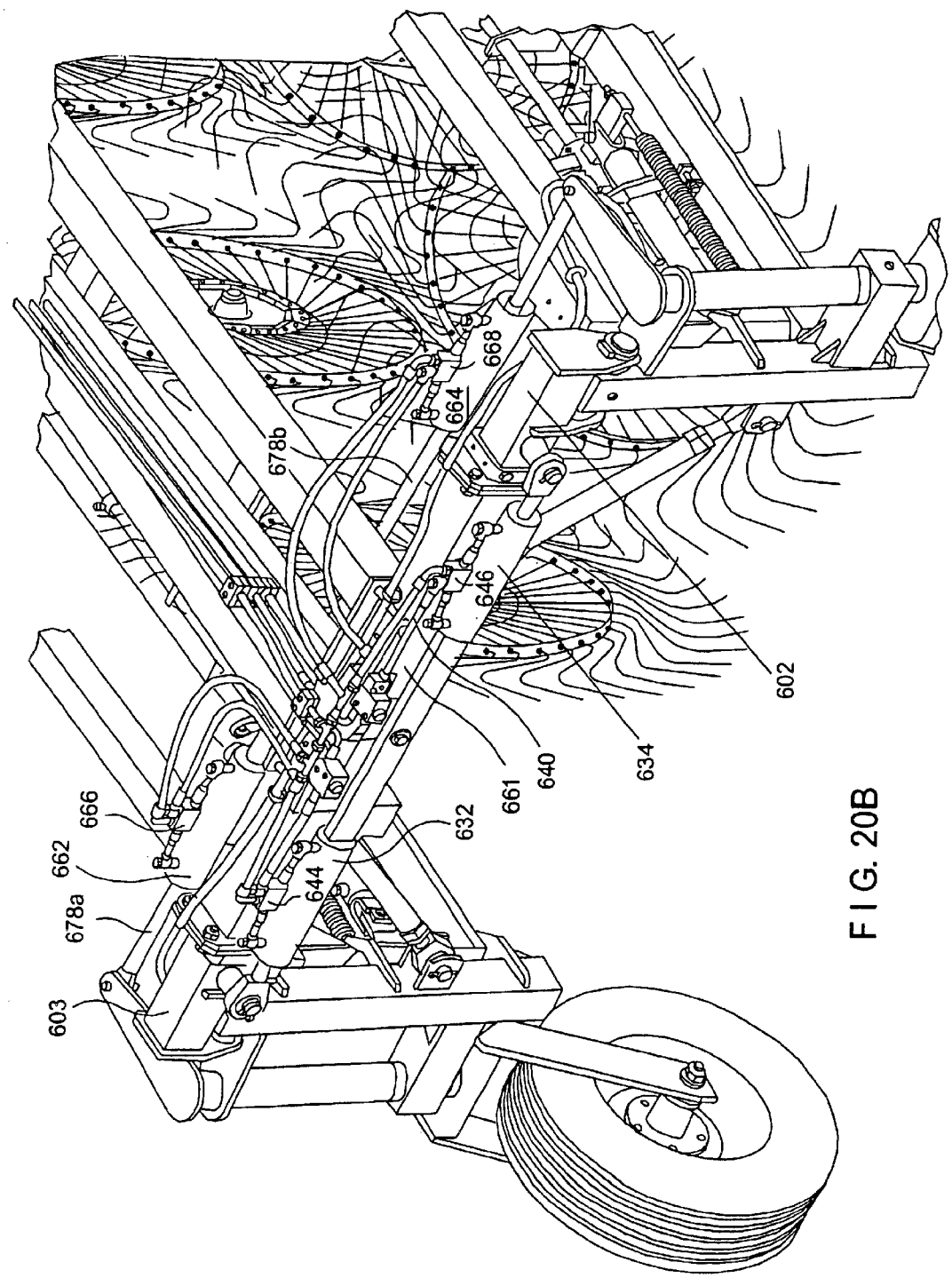
FIG. 20(b) shows a rear perspective view of the rear portion of the towable hay rake having a hydraulically-adjustable automatic steering mechanism, according to the embodiment of the present invention shown in FIG. 19(a)

FIGS. 20(*a*) and 20(*b*) illustrate an automatic steering mechanism in accordance with another embodiment of the present invention. Specifically, FIGS. 20(*a*) and 20(*b*) illustrate one arrangement by which the automatic steering mechanism described above may be employed with a hay rake having hydraulically-operated, telescoping right and left sections of the cross member, as previously described in connection with FIGS. 5 and 6. For instance, FIG. 20(*a*) illustrates right section 602 and left section 603 of the cross member 601 that can telescope in and out of the center section 617 of cross member 601. Dual action actuators 632 and 634 respectively operate the right section 602 and the left section 603, so as to extend and retract them. In addition, FIGS. 20(*a*) and 20(*b*) show a hydraulic power divider valve 642 that is operated by control unit 645. The power divider valve 642 divides the flow of hydraulic fluid between the actuators 632, 634. In this exemplary embodiment, the actuators 632, 634 are placed adjacent to the cross member 601, however, according to alternative embodiments of the present invention, they may be positioned in other suitable positions, e.g., inside hollow parts of the crosswise member 601. In addition, the power divider valve 642 divides the flow between actuators 662, 664, which are disposed on right and left sections 678*a*, 678*b* of the cross-member 678. The power divider valve 642 is used to control whether one or both of the actuators 632, 634 are operated, and whether they are extended or retracted. Simultaneously, the power divider valve 642 is used to control whether one or both of the actuators 662, 664 are operated, and whether they are extended or retracted. In the preferred embodiment, the power divider valve 642 is configured to operate the actuator 632 and the actuator 662 simultaneously, so that when the right section 602 of the cross member 601 is extended or retracted by the operation of the actuator 632, the right section 678*a* of the cross member 678 is extended or retracted by an equal amount by the operation of the actuator 662. Likewise, in the preferred embodiment, the power divider valve 642 is configured to operate the actuator 634 and the actuator 664 simultaneously, so that when the left section 603 of the cross member 601 is extended or retracted by the operation of the actuator 634, the left section 678*b* of the cross member 678 is extended or retracted by an equal amount by the operation of the actuator 664. Hydraulic shutoff valves 644, 646 are associated with the actuators 632, 634, respectively, while hydraulic shutoff valves 666, 668 are associated with the actuators 662, 664, respectively. The hydraulic shutoff valves 644, 646, 666, 668 are used to block movement of the corresponding actuators 632, 634, 662, 664, when pressurized fluid is not provided. In a preferred embodiment, the hydraulic shutoff valves 644 and 666 are configured to operate simultaneously, such that when the hydraulic shutoff valve 644 blocks movement of actuator 632 to thereby prevent unwanted movement of the right section 602 of the cross member 601, the hydraulic shutoff valve 666 simultaneously blocks movement of actuator 662 to prevent unwanted movement of section 678*a* of the cross member 678. Likewise, the hydraulic shutoff valves 646 and 668 are preferably configured to operate simultaneously, such that when the hydraulic shutoff valve 646 blocks movement of actuator 634 to thereby prevent unwanted movement of the left section 603 of the cross member 601, the hydraulic shutoff valve 668 simultaneously blocks movement of actuator 664 to prevent unwanted movement of section 678*b* of the cross member 678. According to one embodiment of the present invention, the hydraulic shutoff valves 644, 646, 666, 668, operate automatically. However, in alternatives of this exemplary embodiment, the hydraulic shutoff valves 644, 646, 666, 668, may be operated automatically when the pressure in hydraulic lines 640 is low, when there is no pressure provided, or may be operated by the control unit 645 in response to preselected conditions. In a further alternative of this exemplary embodiment, shutoff valves 644, 646, 666, 668, are manually operated, to manually prevent extension and retraction of the right and left sections 602 and 603, and sections 678*a* and 678*b* of the cross member 678.

Figure 21:
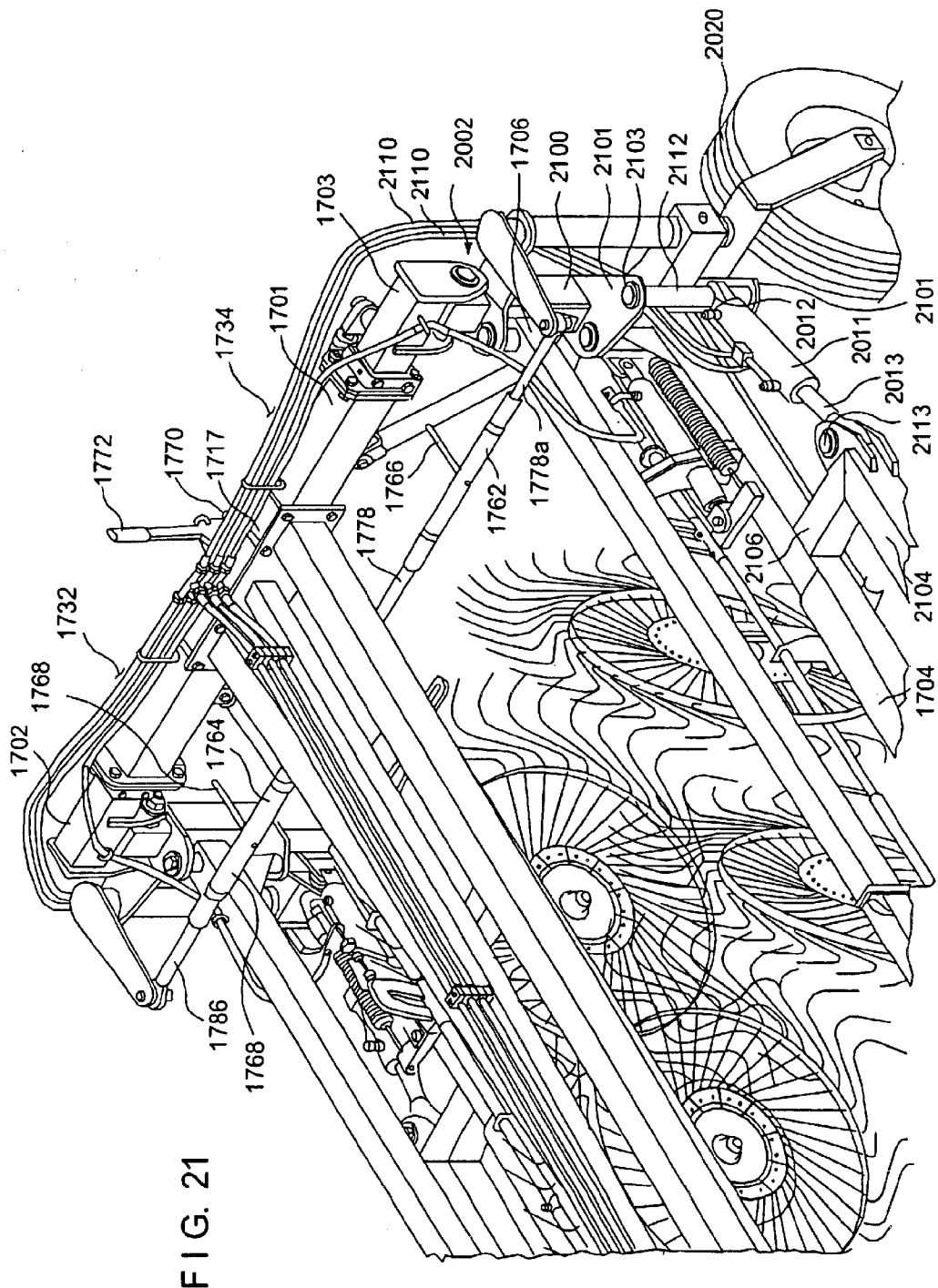
FIG. 21 shows a perspective view of a rear portion of a towable hay rake having a hydraulically-adjustable automatic steering mechanism, according to another embodiment of the present invention.

FIG. 21 illustrates an automatic steering mechanism in accordance with still another embodiment of the present invention. Specifically, FIG. 21 illustrates one arrangement by which an automatic steering mechanism may be employed with a hay rake having both manually-operated, telescoping right and left sections of the cross member, as previously described in connection with FIG. 9 and FIGS. 19(*a*) and 19(*b*), and dual action hydraulic cylinders for moving the hay rake arms between open and closed positions, as previously described in connection with FIGS. 1 to 16(*c*). For instance, FIG. 21 illustrates right section 1702 and left section 1703 of the cross member 1701 that can telescope in and out of the center section 1717 of cross member 1701. Dual action actuators 1732 and 1734 (partially hidden from view in FIG. 21) respectively operate the right section 1702 and the left section 1703, so as to extend and retract them. In the embodiment shown in FIG. 21, the actuators 1732 and 1734 are manually-operated, dual action screw jacks connected to center section 1717 at one end, and respectively to right and left sections 1702 and 1703 on the other end. In the embodiment shown, both the actuators 1732 and 1734 are actuated by a ratchet mechanism 1770 attached to center section 1717, which is manually operated by the operator using lever 1772. In addition, FIG. 21 illustrates dual action actuators 1762 and 1764 on sections 1778*a* and 1778*b*, respectively, of the cross member 1778. Preferably, these dual action actuators 1762 and 1764 are also manually-operated, dual action screw jacks. In the embodiment shown, the actuators 1762 and 1764 are manually operated by a user with handles 1766 and 1768, respectively. In an alternative embodiment (not-shown), the actuators 1762 and 1764 may be actuated by the ratchet mechanism 1770 attached to the center section 1717, such that actuation of the actuators 1732 and 1734 to extend or retract the right and left sections 1702, 1703, automatically and simultaneously actuates the actuators 1762 and 1764 to extend and retract sections 1778*a* and 1778*b* of the cross member 1778. According to still another embodiment, separate ratchet mechanisms may be employed, e.g., a first ratchet mechanism to simultaneously operate the actuators 1734 and 1762, and a second ratchet mechanism to simultaneously operate the actuators 1732 and 1764.

In addition, FIG. 21 illustrates two wheels 2020 are attached to support 100. There are two support plates 2101 (an upper support plate and a lower support plate) attached to the support 2100 at a location above the wheels 2020 and underneath the crosswise member 1701. The support plates 2101 may be attached to the support 2100, e.g., by a welding connection. The support plates 2101 are attached to the support 2100 such that a main plane of the support plates is parallel to the ground when the hay rake is in operation. The support plates 2101 are disposed from each other at a distance such that the end 1706 of the rake arm 1704 to be connected to the section 2002 of the crosswise member 1701 (to the support plate 2101 and therewith to the support 2100 and therewith to the crosswise member 1701) fits between the two support plates 2101. Disposed within openings in the upper and lower support plates 2101 is a shaft 2112 that forms a pivot 2103. Attached to the shaft 2112, there is a first section 2012 of the first actuator 2011. The second section 2013 of the first actuator 2011 is connected by means of a hinge 2113 to the push rod 2104 which is connected to the rake arm 1704 by means of the attachment elements 2106. Furthermore, there are provided hydraulic lines 2110 which are connected to the first actuator 2011. In the embodiment shown, the first actuator 2011 is a dual action hydraulic cylinder. In this embodiment, when the first actuator 2011 is actuated by providing a hydraulic fluid pressure to the first actuator 2011 via the hydraulic lines 2110, the rake arm 1704 is pivoted relative to the cross-wise member 1701. The attachments of the left and right rake arms to the crosswise member 1701 preferably have the same, but mirror-imaged, configurations.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A hay rake towable by a towing vehicle, the hay rake comprising:
   a front portion connectable to the towing vehicle;
   at least one wheel mounted to the hay rake, each of the wheels mounted on oppositely-disposed sections of a second cross member at a rear end of the hay rake;
   an automatic steering mechanism, the automatic steering mechanism coupled to the front portion of the hay rake and configured to be actuated by a change in towing direction of the towing vehicle, the automatic steering mechanism further configured upon actuation to steer the at least one wheel;
   at least one rotatable element configured to rotate, and at least one longitudinally-movable element configured to move, upon a change in towing direction, the at least one rotatable element and the at least one longitudinally-movable element coupled to and configured to cause a first cross member coupled to the at least one wheel to move in a direction corresponding to the change in towing direction of the hay rake,
   wherein at least one of the first and second cross members is extendible and retractable by hydraulics, and wherein the first cross member includes a left section having a wheel mounted thereon and a right section having a wheel mounted thereon, wherein the left section and the right section of the first cross member are extendible and retractable by a corresponding dual action hydraulic actuator, the operation of each dual action hydraulic actuator being controlled by a power divider valve, the power divider valve configured to divide an actuating hydraulic fluid between the first and second hydraulic actuators.

2. The hay rake of claim 1, wherein the hay rake includes a stop valve coupled to each one of the dual action hydraulic actuators, the stop valves blocking movement of the corresponding hydraulic actuators when actuating hydraulic fluid is not being supplied to the corresponding hydraulic actuators.

3. The hay rake of claim 2, wherein at least one of the power divider valves and the stop valves are controlled by a controller.

4. A hay rake towable by a towing vehicle, the hay rake comprising:
   a front portion connectable to the towing vehicle;
   at least one wheel mounted to the hay rake, each of the wheels mounted on oppositely-disposed sections of a second cross member at a rear end of the hay rake;
   an automatic steering mechanism, the automatic steering mechanism coupled to the front portion of the hay rake and configured to be actuated by a change in towing direction of the towing vehicle, the automatic steering mechanism further configured upon actuation to steer the at least one wheel;
   at least one rotatable element configured to rotate, and at least one longitudinally-movable element configured to move, upon a change in towing direction, the at least one rotatable element and the at least one longitudinally-movable element coupled to and configured to cause a first cross member coupled to the at least one wheel to move in a direction corresponding to the change in towing direction of the hay rake,
   wherein at least one of the first and second cross members is extendible and retractable by hydraulics, and wherein the second cross member includes a left section coupled to a mounting for a first wheel and a right section coupled to a mounting for a second wheel, wherein the left section and the right section of the second cross member are extendible and retractable by a corresponding dual action hydraulic actuator, the operation of each dual action hydraulic actuator being controlled by a power divider valve.

5. The hay rake of claim 4, wherein the hay rake includes a stop valve coupled to each one of the dual action hydraulic actuators.

6. The hay rake of claim 5, wherein at least one of the power divider valve and the stop valves are controlled by a controller.

7. The hay rake of claim 6, wherein the controller is configured to actuate the left sections of the first and the second cross members simultaneously, and is further configured to actuate the right sections of the first and the second cross members simultaneously, so as to provide synchronous and symmetrical movements of the left sections of the first and the second cross members and to provide synchronous and symmetrical movements of the right sections of the first and the second cross members.

* * * * *